(12) United States Patent
Take

(10) Patent No.: US 8,867,146 B2
(45) Date of Patent: Oct. 21, 2014

(54) IMAGING LENS, OPTICAL APPARATUS EQUIPPED THEREWITH, AND METHOD FOR MANUFACTURING IMAGING LENS

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 184 days.

(21) Appl. No.: 13/166,654

(22) Filed: Jun. 22, 2011

(65) Prior Publication Data

US 2011/0317281 A1 Dec. 29, 2011

(30) Foreign Application Priority Data

Jun. 23, 2010 (JP) ................. 2010-142921

(51) Int. Cl.
*G02B 15/14* (2006.01)
*G02B 13/00* (2006.01)
*G02B 27/64* (2006.01)

(52) U.S. Cl.
CPC ............ *G02B 13/004* (2013.01); *G02B 27/646* (2013.01); *G02B 13/0045* (2013.01); *G02B 13/006* (2013.01)
USPC ........................................................ 359/691

(58) Field of Classification Search
CPC .... G02B 15/173; G02B 15/177; G02B 15/22; G02B 21/02; G02B 13/00; G02B 13/24; G02B 13/08; G02B 13/18; G02B 13/04; G02B 9/34; B60R 1/005
USPC ......... 359/684, 691, 693, 785, 757, 758, 648, 359/680, 671, 720, 781, 717, 708, 749, 753
See application file for complete search history.

(56) References Cited

U.S. PATENT DOCUMENTS

| 4,390,251 | A | * | 6/1983 | Kato .............................. 359/768 |
| 4,812,027 | A | | 3/1989 | Yanagisawa |
| 5,781,340 | A | * | 7/1998 | Suzuki ............................ 700/28 |
| 7,944,625 | B2 | | 5/2011 | Hatada |
| 2009/0116121 | A1 | * | 5/2009 | Take .............................. 359/687 |
| 2010/0033848 | A1 | | 2/2010 | Hatada |
| 2010/0201782 | A1 | * | 8/2010 | Yamada et al. ................. 348/36 |

FOREIGN PATENT DOCUMENTS

| JP | 59-143116 A | 8/1984 |
| JP | 64-078208 A | 3/1989 |
| JP | 2001-056434 A | 2/2001 |
| JP | 2007-086308 A | 4/2007 |
| JP | 2009-258159 A | 11/2009 |
| JP | 2010-039340 A | 2/2010 |

* cited by examiner

*Primary Examiner* — James Greece
*Assistant Examiner* — Jie Lei
(74) *Attorney, Agent, or Firm* — Miles & Stockbridge P.C.

(57) ABSTRACT

The imaging lens includes, in order from an object side, a first lens group having positive refractive power; and a second lens group having the positive refractive power, the first lens group being fixed with respect to an image plane, the second lens group being moved toward the object side to adjust a focus on a close object, and a given conditional expression being satisfied, thereby disclosing a downsized imaging lens having a wide angle of view, capable of preferably correcting various aberrations upon focusing on a close object from an infinitely distant object and having high optical performance over an entire picture, an optical apparatus including the imaging lens and an imaging lens manufacturing method.

31 Claims, 18 Drawing Sheets

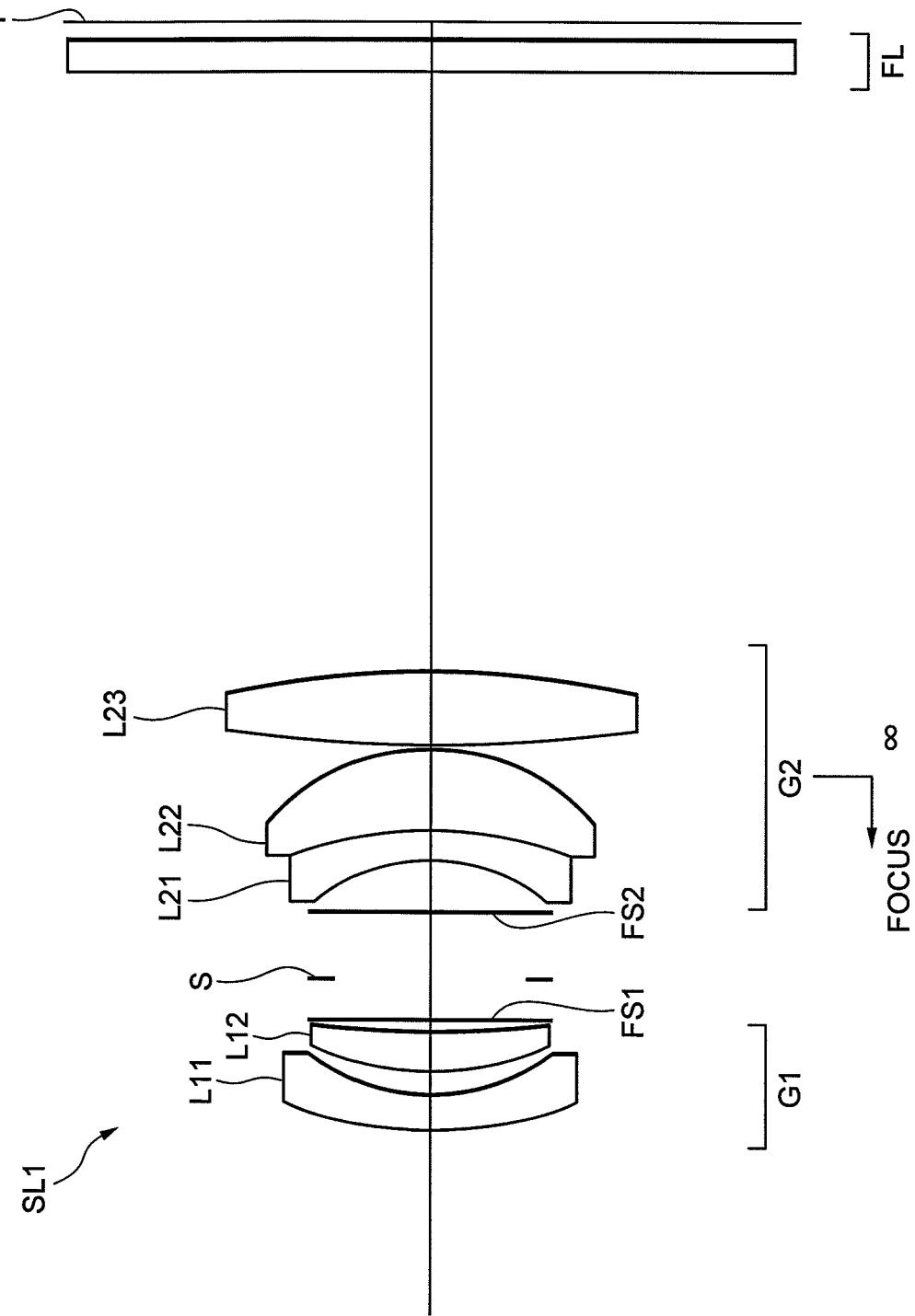

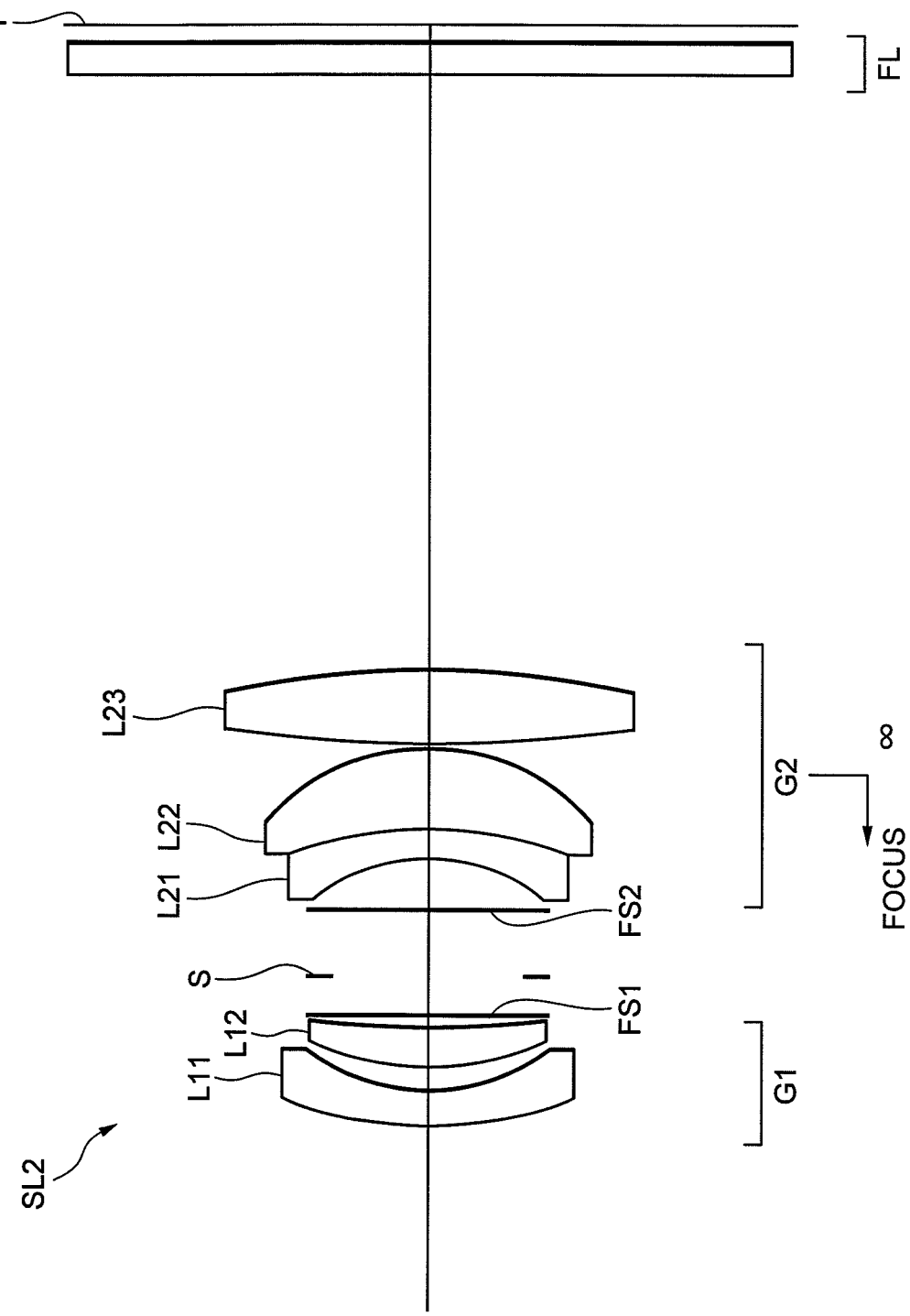

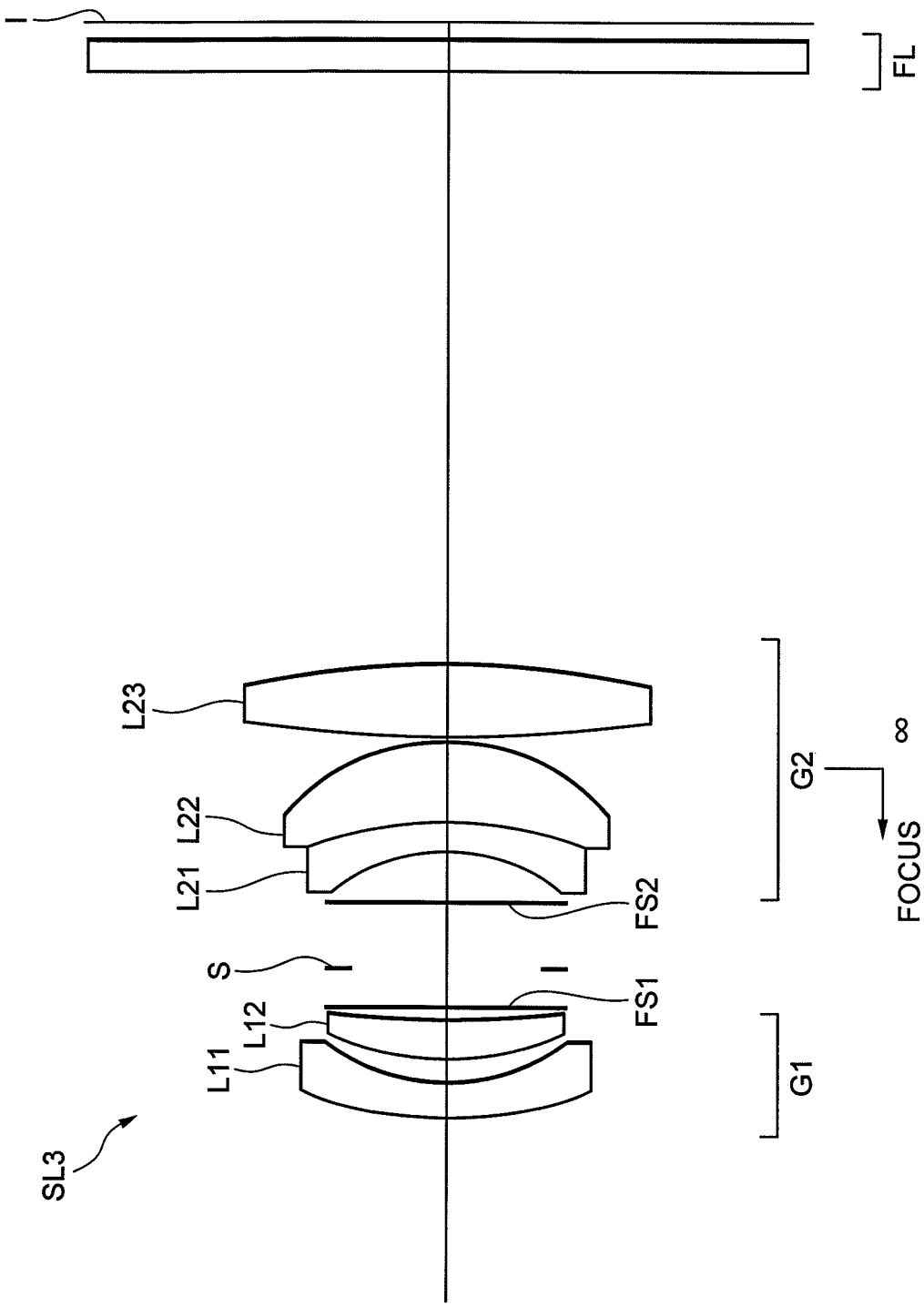

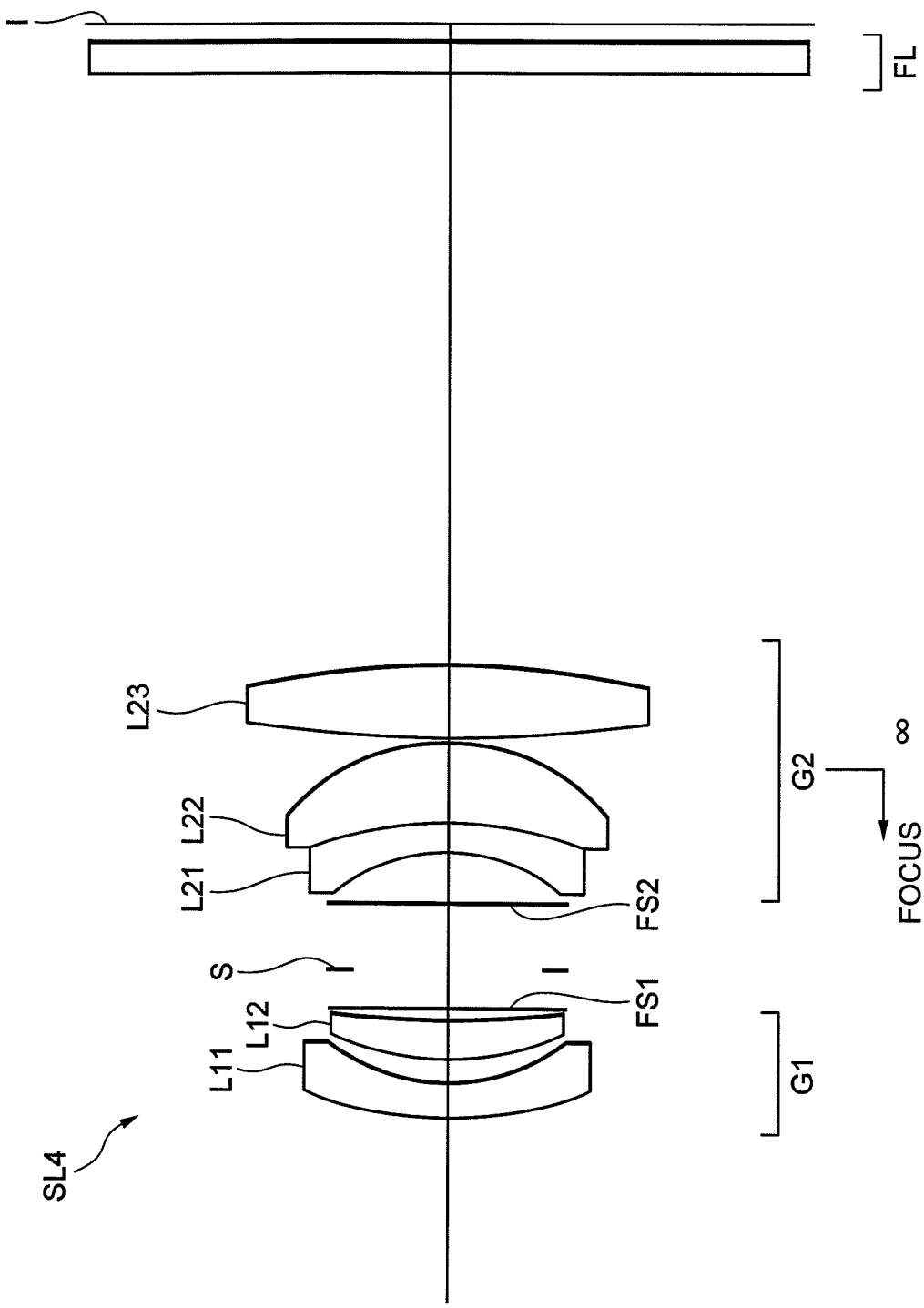

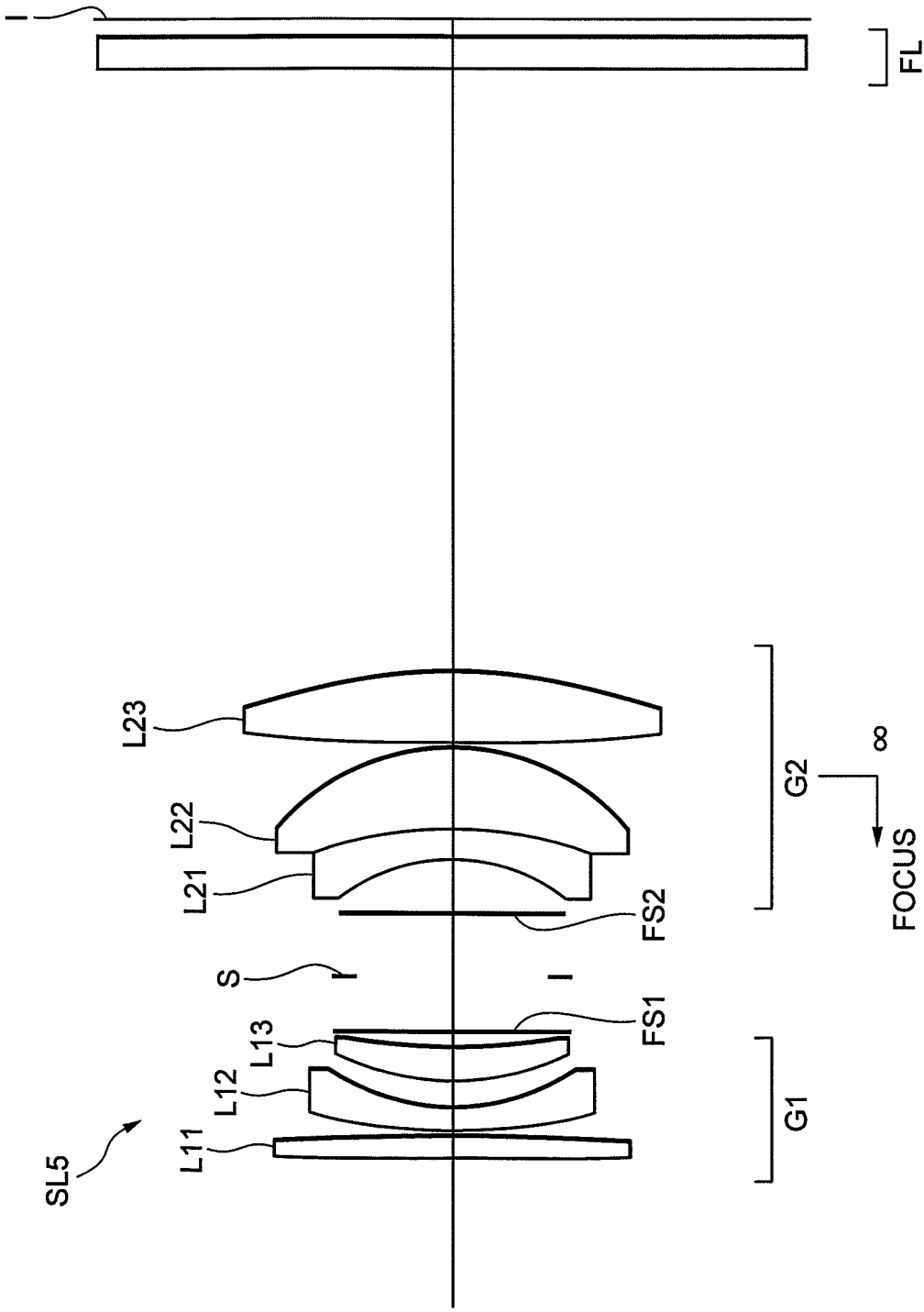

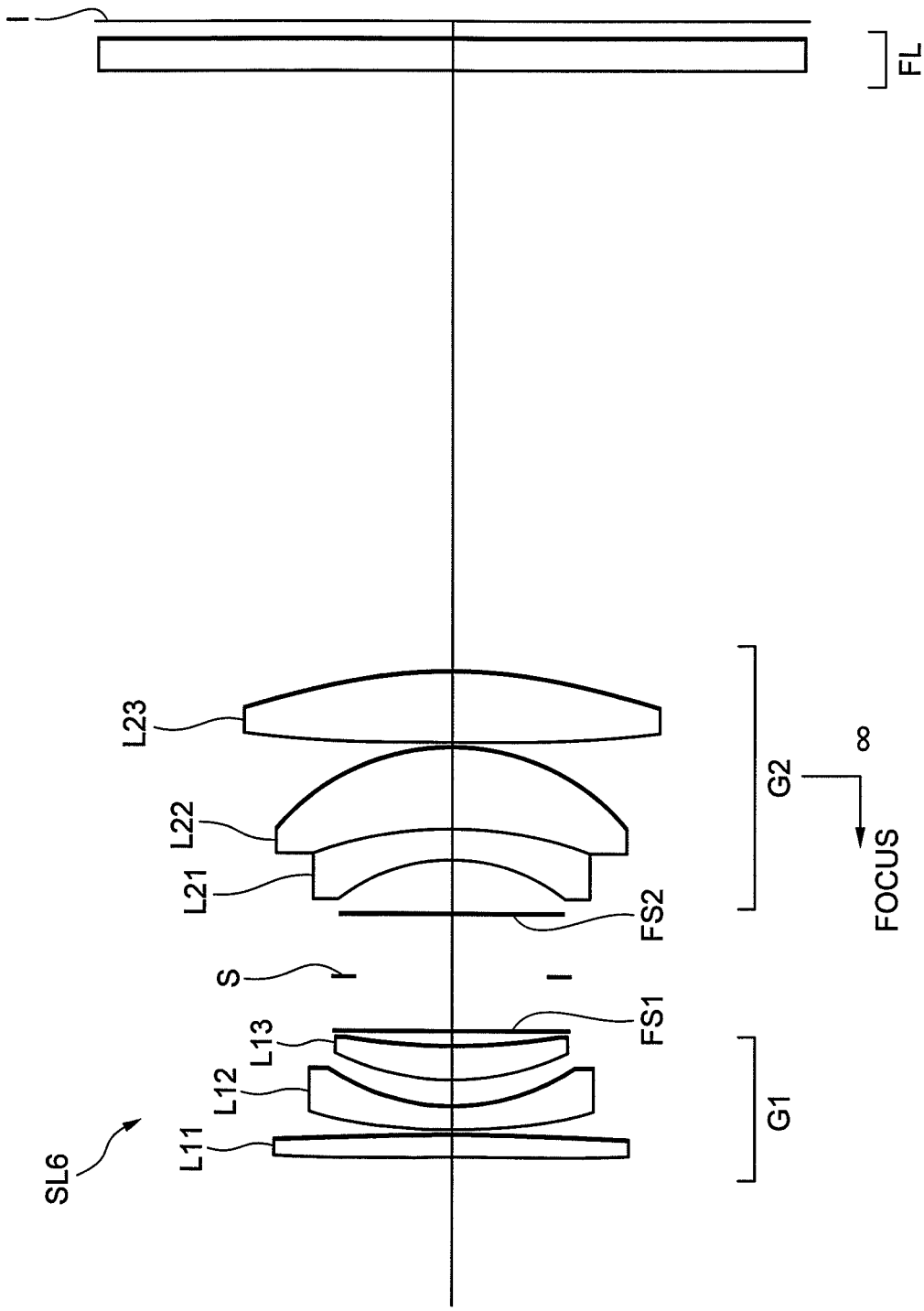

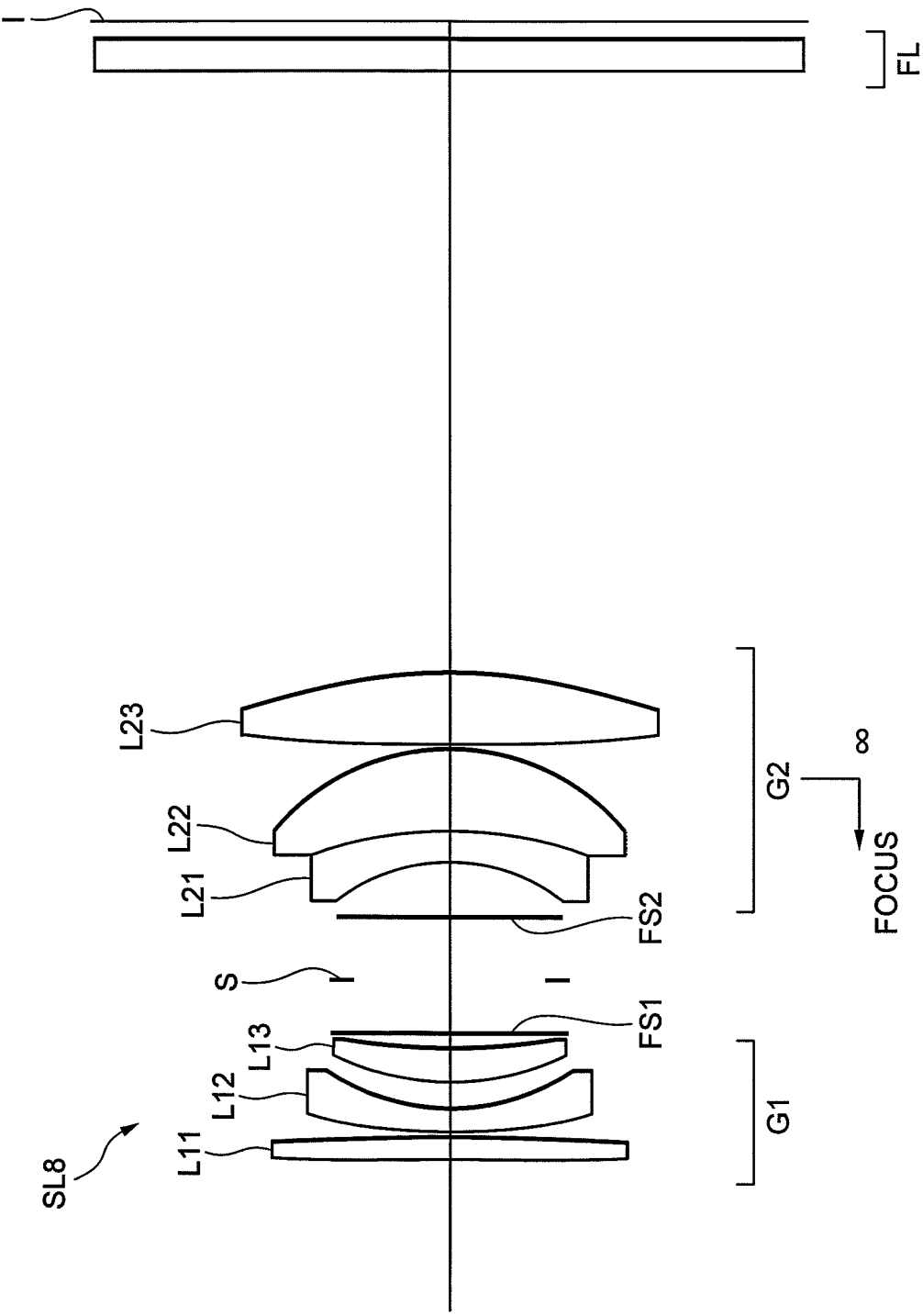

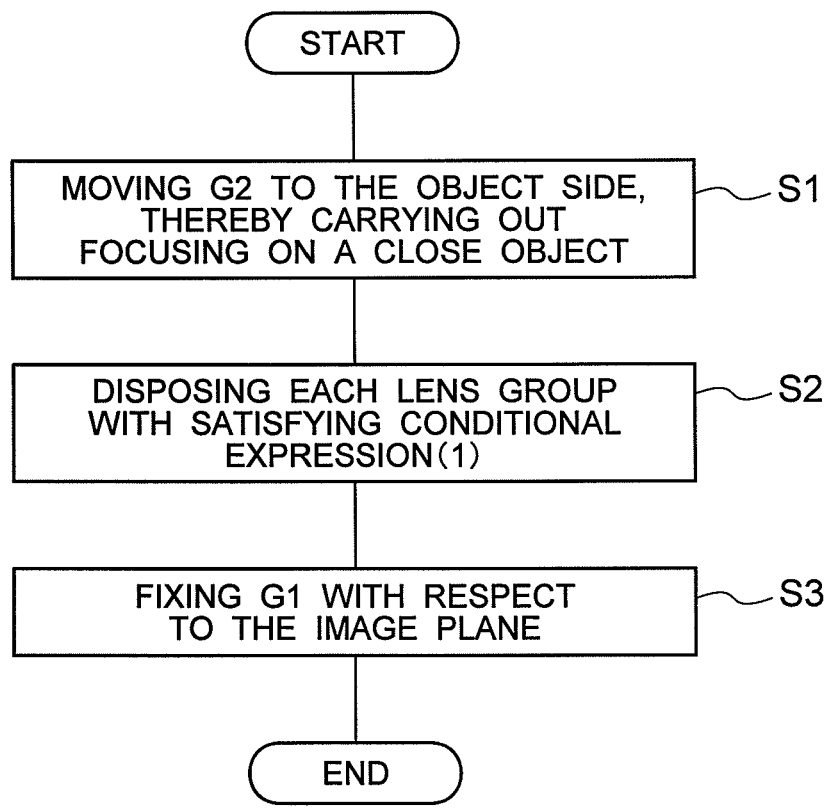

IMAGING LENS, OPTICAL APPARATUS EQUIPPED THEREWITH, AND METHOD FOR MANUFACTURING IMAGING LENS

The disclosure of the following priority application is herein incorporated by reference:

Japanese Patent Application No. 2010-142921 filed on Jun. 23, 2010.

BACKGROUND OF THE INVENTION

1. Field of the Invention

The present invention relates to an imaging lens, an optical apparatus equipped with the imaging lens, and a method for manufacturing the imaging lens.

2. Related Background Art

In a camera for photography, a video camera, etc., a downsized lens, of which an angle of view is on the order of 50 degrees and an f-number is relatively small (bright), has hitherto been exemplified by an imaging lens including, in order from an object side, a first lens group composed of a negative lens and a positive lens, an aperture stop and a second lens group composed of a cemented lens constructed by a negative lens cemented with a positive lens, and a positive lens (refer to, e.g., Japanese Patent Application Laid-Open Publication No. 2001-56434).

The conventional imaging lens has, however, such a problem that in the case of taking a configuration of focusing by a whole imaging lens system, a total lens length of the imaging lens extends upon focusing on a close object from an infinitely distant object. Further, another problem is that various aberrations are corrected at an unsatisfactory level upon focusing on the close object.

SUMMARY OF THE INVENTION

It is an object of the present invention, which was devised in view of these problems, to provide a downsized imaging lens having a wide angle of view, capable of preferably correcting various aberrations upon focusing on a close object from an infinitely distant object and exhibiting high optical performance over an entire picture, an optical apparatus equipped with the imaging lens and a method for manufacturing the imaging lens.

According to a first aspect of the present invention, there is provided an imaging lens comprising, in order from an object side: a first lens group having positive refractive power; and a second lens group having positive refractive power, the first lens group being fixed with respect to an image plane, the second lens group being moved toward the object side to adjust a focus on a close object, and the following conditional expression (1) being satisfied:

$$1.50 < Po/(TLa - \Sigma d) < 2.50 \quad (1)$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group.

According to a second aspect of the present invention, there is provided an optical apparatus comprising: an imaging lens configured to form an image of an object on a predetermined image plane, wherein the imaging lens is the imaging lens according to the first aspect.

According to a third aspect of the present invention, there is provided a method for manufacturing an imaging lens including, in order from an object side, a first lens group having positive refractive power, and a second lens group having the positive refractive power, the method comprising steps of: moving the second lens group toward the object side to carry out focusing on a close object; disposing each lens with satisfying the following conditional expression (1):

$$1.50 < Po/(TLa - \Sigma d) < 2.50 \quad (1)$$

where TLa denotes an air-converted total lens length of the imaging lens, Po denotes a distance from an image plane to an exit pupil in the imaging lens, and $\Sigma d$ denotes a distance along an optical axis between the most object side lens surface of the first lens group and the most image side lens surface of the second lens group; and fixing the first lens group with respect to the image plane.

According to the present invention, it is feasible to provide the downsized imaging lens having a wide angle of view, capable of preferably correcting various aberrations upon focusing on a close object from an infinitely distant object and exhibiting high optical performance over the entire picture, an optical apparatus including the imaging lens and a method for manufacturing the imaging lens.

BRIEF DESCRIPTION OF THE DRAWINGS

FIG. 1 is a sectional view showing a lens configuration of an imaging lens according to Example 1.

FIGS. 2A, 2B are graphs of various aberrations of the imaging lens according to Example 1 in which FIG. 2A shows upon focusing on an infinitely distant object, and FIG. 2B shows upon focusing on a close object.

FIG. 3 is a sectional view showing a lens configuration of an imaging lens according to Example 2.

FIGS. 4A, 4B are graphs of various aberrations of the imaging lens according to Example 2 in which FIG. 4A shows upon focusing on an infinitely distant object, and FIG. 4B shows upon focusing on a close object.

FIG. 5 is a sectional view showing a lens configuration of an imaging lens according to Example 3.

FIGS. 6A, 6B are graphs of various aberrations of the imaging lens according to Example 3 in which FIG. 6A shows upon focusing on an infinitely distant object, and FIG. 6B shows upon focusing on a close object.

FIG. 7 is a sectional view showing a lens configuration of an imaging lens according to Example 4.

FIGS. 8A, 8B are graphs of various aberrations of the imaging lens according to Example 4 in which FIG. 8A shows upon focusing on an infinitely distant object, and FIG. 8B shows upon focusing on a close object.

FIG. 9 is a sectional view showing a lens configuration of an imaging lens according to Example 5.

FIGS. 10A, and 10B are graphs of various aberrations of the imaging lens according to Example 5 in which FIG. 10A shows upon focusing on an infinitely distant object, and FIG. 10B shows upon focusing on a close object.

FIG. 11 is a sectional view showing a lens configuration of an imaging lens according to Example 6.

FIGS. 12A, 12B are graphs of various aberrations of the imaging lens according to Example 6 in which FIG. 12A shows upon focusing on an infinitely distant object, and FIG. 12B shows upon focusing on a close object.

FIGS. 14A, 14B are graphs of various aberrations of the imaging lens according to Example 7 in which FIG. 14A shows upon focusing on an infinitely distant object, and FIG. 14B shows upon focusing on a close object.

FIG. 15 is a sectional view showing a lens configuration of an imaging lens according to Example 8.

FIGS. 16A, 16B are graphs of various aberrations of the imaging lens according to Example 8 in which FIG. 16A shows upon focusing on an infinitely distant object, and FIG. 16B shows upon focusing on a close object.

FIG. 18 is a flowchart showing an outline of a method for manufacturing an imaging lens according to the present invention.

DESCRIPTION OF THE MOST PREFERRED EMBODIMENT

Figure 2A:
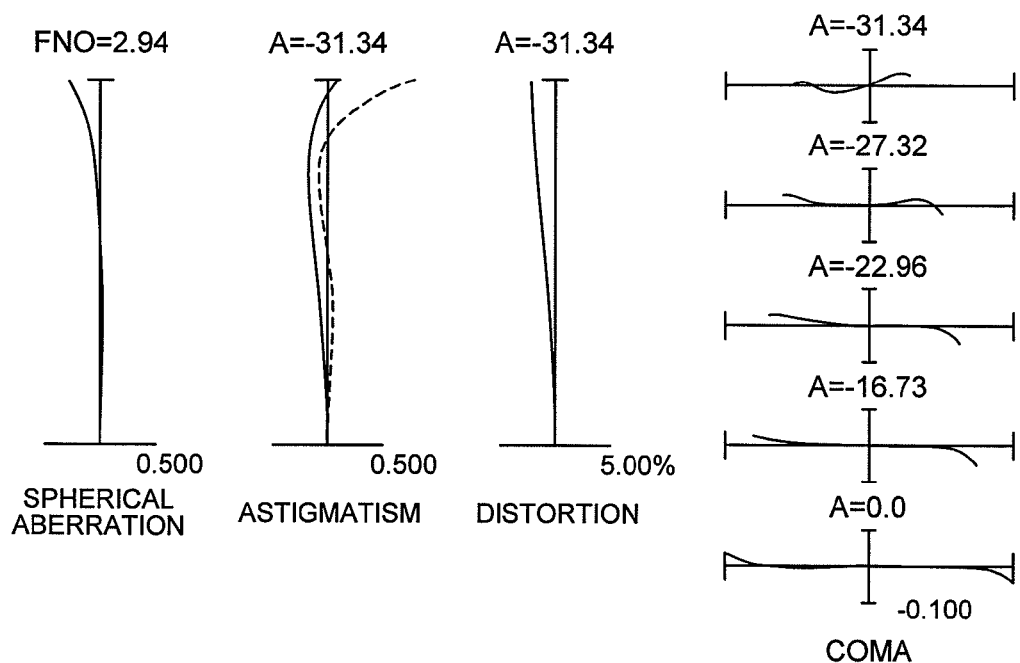

An imaging lens, an optical apparatus equipped therewith and a method for manufacturing the imaging lens according to the present invention, will hereinafter be described.

The imaging lens according to the present invention is characterized by including, in order from an object side, a first lens group having positive refractive power and a second lens group having a positive refractive power, adjusting a focus on a close object by shifting the second lens group toward the object side while fixing the first lens group with respect to an image plane, and satisfying the following conditional expression (1):

$$1.50 < Po/(TLa - \Sigma d) < 2.50 \qquad (1)$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group.

The imaging lens according to the present invention, as described above, includes, in order from the object side, the first lens group having positive refractive power and the second lens group having positive refractive power, the first lens group is fixed with respect to the image plane, and the second lens group is moved toward the object side, thereby adjusting the focus on the close object from an infinitely distant object. With this configuration, it is feasible to obtain the downsized imaging lens having a wide angle of view and excellent optical performance.

The present invention enables, under such a configuration, downsizing and higher optical performance to be attained by satisfying conditional expression (1).

Conditional expression (1) is a conditional expression for specifying proper ranges of the total lens length and the exit pupil of the imaging lens. Note that TLa in conditional expression (1) represents a value into which the total lens length of the imaging lens undergoes the air conversion. To be specific, TLa is the value given when measuring the total lens length of the imaging lens in a state where an optical block such as a filter having no refractive power is removed from within an optical path in a space from the lens surface closes to the image side in the second lens group to the image plane (the same shall be applied to the following discussion).

When the value $Po/(TLa - \Sigma d)$ is equal to or exceeds the upper limit of conditional expression (1), the exit pupil relatively increases, and a coma and a curvature of field are hard to be corrected, which is an undesirable aspect. Further, the total lens length of the imaging lens relatively increases, and, though advantageous in terms of downsizing, a back focal length cannot be secured. Moreover, spherical aberration and coma that occur in the whole imaging lens become excessively large, which is also the undesirable aspect. As described above, when the value $Po/(TLa - \Sigma d)$ is equal to or exceeds the upper limit of conditional expression (1), such undesirable aspects arise that the back focal length can not be ensured and spherical aberration and curvature of field are not well corrected. As a result, it is impossible to accomplish the object of the present invention such as acquiring the excellent optical performance.

It should be noted that it is preferable for ensuring the effect of the present invention that the upper limit of conditional expression (1) is set to 2.20. Moreover, it is preferable for further ensuring the effect of the present invention that the upper limit of conditional expression (1) is set to 2.00. Moreover, it is preferable for still further ensuring the effect of the present invention that the upper limit of conditional expression (1) is set to 1.90.

On the other hand, when the value $Po/(TLa - \Sigma d)$ is equal to or falls below the lower limit of conditional expression (1), the exit pupil relatively decreases, with the result that the total lens length of the imaging lens is scaled up, which is contrary to the purpose of the present invention. Further, spherical aberration and curvature of field are not well corrected, which is also the undesirable aspect. Moreover, a thickness of the imaging lens, i.e., the distance along the optical axis between the lens surface closest to the object side in the first lens group and the lens surface closest to the image side in the second lens group, is reduced as compared with the total lens length of the imaging lens, a configuration of which is advantageous in terms of downsizing, however, coma and curvature of field each occurring in the whole imaging lens system become too large, and consequently the object of the present invention such as acquiring the superior optical performance can not be accomplished.

It should be noted that it is preferable for ensuring the effect of the present invention that the lower limit of conditional expression (1) is set to 1.60. Further, it is preferable for further ensuring the effect of the present invention that the lower limit of conditional expression (1) is set to 1.65. Moreover, it is preferable for still further ensuring the effect of the present invention that the lower limit of conditional expression (1) is set to 1.70.

Further, it is preferable for the imaging lens according to the present invention to satisfy the following conditional expression (2) in order to attain the downsizing and the higher optical performance:

$$1.80 < TLa/\Sigma d < 3.00 \qquad (2)$$

where TLa denotes the air converted total lens length of the imaging lens, and $\Sigma d$ denotes a distance along the optical axis between the lens surface closest to the object side in the first lens group and the lens surface closest to the image side in the second lens group.

Conditional expression (2) is a conditional expression for specifying the proper total lens length of the imaging lens for keeping a balance between the downsizing and the higher optical performance.

When the value $TLa/\Sigma d$ is equal to or exceeds the upper limit of conditional expression (2), the total lens length of the imaging lens increases, which loses the balance between the downsizing and the higher optical performance. As a result, the total lens length of the imaging lens is scaled up, and this is contrary to the purpose of the present invention, which is an undesirable aspect.

It is to be noted that it is preferable for ensuring the effect of the present invention that the upper limit of conditional expression (2) is set to 2.80. Moreover, it is preferable for further ensuring the effect of the present invention that the upper limit of conditional expression (2) is set to 2.60.

On the other hand, when the value TLa/Ed is equal to or falls below the lower limit of conditional expression (2), though advantageous in terms of the downsizing, spherical aberration and coma each occurring in the whole imaging lens can not be well corrected, which is also the undesirable aspect. Furthermore, the back focal length is hard to be extended.

It should be noted that it is preferable for ensuring the effect of the present invention that the lower limit of conditional expression (2) is set to 2.20. Moreover, it is preferable for further ensuring the effect of the present invention that the lower limit of conditional expression (2) is set to 2.10. Moreover, it is preferable for still further ensuring the effect of the present invention that the lower limit of conditional expression (2) is set to 2.20.

Moreover, it is preferable that the first lens group of the imaging lens according to the present invention is composed of a plurality of lens components for attaining the much higher optical performance. The first lens group takes the configuration such as this, thereby enabling the preferable correction of spherical aberration and coma caused solely in the first lens group. Note that the lens component connotes a single lens or a cemented lens constructed by cementing two or more lenses.

In the imaging lens according to the present invention, it is desirable for attaining the much higher optical performance that the first lens group is composed of a plurality of lens components and the lens component closest to the object side in the first lens group is a positive lens component. This configuration enables curvature of field and distortion to be well corrected.

In the imaging lens according to the present invention, it is desirable for taking the balance between the even higher optical performance and the downsizing that the first lens group includes, in order from the object side, a positive lens with its convex surface directed to the object side, a negative meniscus lens with its convex surface directed to the object side and a positive meniscus lens with its convex surface directed to the object side. The first lens group takes such a configuration, it is feasible to correct spherical aberration, curvature of field and coma, preferably.

Moreover, in the imaging lens according to the present invention, it is desirable for taking the balance between the much higher optical performance and the downsizing that the first lens group includes, in order from the object side, a negative meniscus lens with its convex surface directed to the object side and a positive meniscus lens with its convex surface directed to the object side. The first lens group being thus configured, spherical aberration, curvature of field and coma can be well corrected.

Furthermore, in the imaging lens according to the present invention, it is desirable for taking the balance between the higher optical performance and the downsizing that the negative meniscus lens in the first lens group contains at least one aspherical surface. At least one aspherical surface is disposed on the negative meniscus lens in the first lens group, thereby enabling spherical aberration and curvature of field to be well corrected and the balance with the downsizing to be taken.

Moreover, according to the present invention, it is desirable to satisfy the following conditional expression (3) in order to attain the downsizing and the higher optical performance.

$$1.70 < TLa/f < 2.20 \quad (3)$$

where TLa denotes the air converted total lens length of the imaging lens, and f denotes a focal length of the imaging lens.

Conditional expression (3) is a conditional expression for specifying the proper total lens length and the focal length of the imaging lens for taking the balance between the downsizing and higher optical performance.

When the value TLa/f is equal to or exceeds the upper limit of conditional expression (3), the total lens length of the imaging lens increases, and it follows that the balance between the downsizing and the higher optical performance is lost. Consequently, the total lens length of the imaging lens is scaled up, which is undesirably contrary to the purpose of the present invention.

It should be noted that it is preferable for ensuring the effect of the present invention that the upper limit of conditional expression (3) is set to 2.15. Moreover, it is preferable for further ensuring the effect of the present invention that the upper limit of conditional expression (3) is set to 2.10.

On the other hand, when the value TLa/f is equal to or falls below the lower limit of conditional expression (3), though advantageous in terms of the downsizing, spherical aberration, coma and curvature of field each caused in the whole lens system can not be well corrected, which is the undesirable aspect.

It should be noted that it is preferable for ensuring the effect of the present invention that the lower limit of conditional expression (3) is set to 1.75. Moreover, it is preferable for further ensuring the effect of the present invention that the lower limit of conditional expression (3) is set to 1.80. Additionally, it is preferable for still further ensuring the effect of the present invention that the lower limit of conditional expression (3) is set to 1.85.

In the imaging lens according to the present invention, it is desirable for taking the balance between the much higher optical performance and the downsizing that the second lens group includes, in order from the object side, a cemented lens constructed by a negative meniscus lens with its concave surface directed to the object side cemented with a positive lens with its convex surface directed to the image side, and a positive lens. The second lens group is thus configured, whereby curvature of field and coma can be well corrected.

Moreover, it is desirable for attaining the much higher optical performance that a concave cemented surface of the cemented lens is directed to the object side. The concave cemented surface is directed to the object side, thereby making it possible to correct preferably curvature of field and coma that occur in the second lens group alone.

Further, in the imaging lens according to the present invention, it is desirable for attaining the much higher optical performance that the positive lens in the second lens group contains at least one aspherical surface. At least one aspherical surface is disposed on the positive lens in the second lens group, whereby it is feasible to correct preferably fluctuations of distortion and of curvature of field, which occur upon focusing.

Further, it is preferable for the imaging lens according to the present invention to satisfy the following conditional expression (4) in order to attain the downsizing and the higher optical performance:

$$5.50 < TLa/\Sigma d2 < 6.50 \quad (4)$$

where TLa denotes the air converted total lens length of the imaging lens, and $\Sigma d2$ denotes a distance along the optical axis between the lens surface closest to the object side in the second lens group and the lens surface closest to the image side in the second lens group.

Conditional expression (4) is a conditional expression for specifying the proper total lens length of the imaging lens for keeping the balance between the downsizing and the higher optical performance.

When the value TIa/Σd2 is equal to or exceeds the upper limit of conditional expression (4), the total lens length of the imaging lens increases, which loses the balance between the downsizing and the higher optical performance. Moreover, curvature of field lacks in correction. As a result, the total lens length of the imaging lens is scaled up, and this is contrary to the purpose of the present invention, which is the undesirable aspect.

It is to be noted that it is preferable for ensuring the effect of the present invention that the upper limit of conditional expression (4) is set to 6.40. Moreover, it is preferable for further ensuring the effect of the present invention that the upper limit of conditional expression (4) is set to 6.30. Furthermore, it is preferable for still further ensuring the effect of the present invention that the upper limit of conditional expression (4) is set to 6.20.

On the other hand, when the value TLa/Σd2 is equal to or falls below the lower limit of conditional expression (4), though advantageous in terms of the downsizing, coma and curvature of field each occurring in the imaging lens cannot be well corrected, which is also an undesirable aspect. Furthermore, the back focal length is hard to be extended.

It should be noted that it is preferable for ensuring the effect of the present invention that the lower limit of conditional expression (4) is set to 5.60. Moreover, it is preferable for further ensuring the effect of the present invention that the lower limit of conditional expression (4) is set to 5.65. Moreover, it is preferable for still further ensuring the effect of the present invention that the lower limit of conditional expression (4) is set to 5.70.

Further, it is desirable for the imaging lens according to the present invention to satisfy the following conditional expression (5):

$$0.80 < f/f2 < 1.10 \quad (5)$$

where f denotes a focal length of the imaging lens, and f2 denotes a focal length of the second lens group.

Conditional expression (5) is a conditional expression for specifying the focal length of the second lens group.

When the value f/f2 is equal to or exceeds the upper limit of conditional expression (5), the refractive power of the second lens group becomes strong, with the result that spherical aberration caused solely in the second lens group increases, which is the undesirable aspect.

Incidentally, it is preferable for ensuring the effect of the present invention that the upper limit of conditional expression (5) is set to 1.00. Further, it is preferable for further ensuring the effect of the present invention that the upper limit of conditional expression (5) is set to 0.95.

On the other hand, when the value f/f2 is equal to or falls below the lower limit of conditional expression (5), refractive power of the second lens group becomes weak, and variation in curvature of field increases upon focusing.

It is to be noted that it is preferable for ensuring the effect of the present invention that the lower limit of conditional expression (5) is set to 0.82. Further, it is preferable for further ensuring the effect of the present invention that the lower limit of conditional expression (5) is set to 0.85.

Further, according to the present invention, it is desirable to satisfy the following conditional expression (6):

$$2.50 < f1/f2 < 5.10 \quad (6)$$

where f1 denotes a focal length of the first lens group, and f2 denotes a focal length of the second lens group.

Conditional expression (6) is a conditional expression for specifying a range of an optimum ratio of the focal length of the first lens group to the focal length of the second lens group.

When the value f1/f2 is equal to or exceeds the upper limit of conditional expression (6), refractive power of the first lens group relatively becomes weak, and the correction of spherical aberration becomes insufficient, which is the undesirable aspect. Furthermore, refractive power of the second lens group relatively becomes strong, with the result that coma occurring in the second lens group becomes excessively large, and it is impossible to accomplish the object of the present invention such as acquiring the superior optical performance.

Incidentally, it is preferable for ensuring the effect of the present invention that the upper limit of conditional expression (6) is set to 5.00. Moreover, it is preferable for further ensuring the effect of the present invention that the upper limit of conditional expression (6) is set to 4.80.

On the other hand, when the value f1/f2 is equal to or falls below the lower limit of conditional expression (6), refractive power of the first lens group becomes relatively strong, with the result that spherical aberration and coma occurring solely in the first lens group are hard to be corrected. Further, the refractive power of the second lens group becomes relatively weak, and curvature of field cannot be well corrected, which is the undesirable aspect.

It should be noted that it is preferable for ensuring the effect of the present invention that the lower limit of conditional expression (6) is set to 2.75. Moreover, it is preferable for further ensuring the effect of the present invention that the lower limit of conditional expression (6) is set to 3.00.

Additionally, it is desirable for attaining the much higher optical performance that the imaging lens according to the present invention has an aperture stop between the first lens group and the second lens group. With this configuration, refractive power distribution of the imaging lens is made approximate to a symmetric refractive power distribution attained by disposing, in order from the object side, the lens group having the positive refractive power, the aperture stop and the lens group having the positive refractive power, thereby well correcting curvature of field and distortion.

Moreover, in the imaging lens according to the present invention, it is desirable for keeping the balance between the higher optical performance and the downsizing that the first lens group includes at least one aspherical surface. The aspherical lens is disposed in the first lens group, thereby enabling spherical aberration and curvature of field to be well corrected.

Further, in the imaging lens according to the present invention, it is desirable for keeping the balance between the much higher optical performance and the downsizing that the second lens group includes at least one aspherical surface. The aspherical lens is disposed in the second lens group, thereby enabling spherical aberration and curvature of field to be well corrected.

Furthermore, in the imaging lens according to the present invention, for attaining the much higher optical performance and a high function, the whole or a portion of the second lens group is shifted as a shift lens group in a direction that is substantially perpendicular to the optical axis, whereby the image on the image plane can be shifted. The optical system of the imaging lens according to the present invention is substantially focal between the first lens group and the second lens group, and curvature of field can be suppressed upon shifting the lens.

Further, the imaging lens according to the present invention is configured to, for preventing a failure in photography that is caused by an image blur due to a hand vibration (camera shake), incorporate a vibration detecting system for detecting a vibration of the lens system and a drive means thereof into the lens system and to build up, as a shift lens group, the whole or a portion of one lens group in the lens groups constituting the lens system, thereby enabling decentering to be provided. With this configuration, the shift lens group is driven (moved) by the drive means so as to correct the image blur (a fluctuation in position of the image plane) caused by the vibration of the lens system that is detected by the vibration detection system, and the image is thus shifted, whereby the image blur can be corrected. As described above, the imaging lens according to the present invention enables the whole or a portion of one lens group to function as a so-called vibration reduction optical system.

Furthermore, an optical apparatus according to the present invention is characterized by including the imaging lens having the configuration described above. With this contrivance, it is feasible to realize a downsized optical apparatus having a wide angle of view, capable of preferably correcting various aberrations upon focusing on the close object from the infinitely distant object and exhibiting the high optical performance over the entire picture.

Moreover, a method for manufacturing an imaging lens according to the present invention is a method of manufacturing the imaging lens including, in order from an object side, a first lens group having positive refractive power and a second lens group having positive refractive power, the method comprising steps of:

moving the second lens group toward the object side in a way that adjusts the focus on the close object;

disposing the first lens group and the second lens in the imaging lens with satisfying the following conditional expression (1):

$$1.50 < Po/(TLa - \Sigma d) < 2.50 \qquad (1)$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group; and fixing the first lens group with respect to the image plane.

The method for manufacturing the imaging lens is capable of manufacturing the imaging lens having the wide angle of view, enabling the various aberrations to be preferably corrected upon focusing on the close object from the infinitely distant object and exhibiting the high optical performance over the entire picture.

The imaging lens according to respective numerical examples according to the present invention will hereinafter be described with reference to the accompanying drawings. FIGS. 1, 3, 5, 7, 9, 11, 13 and 15 are sectional views showing configurations of imaging lenses SL1-SL8 and allocations of refractive power thereof according to the respective examples, in which arrowheads depict how a focusing state changes from an infinite-distance focusing state to a near-distance focusing state, i.e., how the respective lens groups move upon focusing.

EXAMPLE 1

FIG. 1 is a sectional view showing a configuration of an imaging lens SL1 according to Example 1 of the present invention.

As illustrated in FIG. 1, the imaging lens SL1 according to Example 1 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a negative meniscus lens L11 (a first lens component) with its convex surface directed to the object side and a positive meniscus lens L12 (a second lens component) with its convex surface directed to the object side. The second lens group G2 is composed of a cemented lens (a third lens component) constructed by a negative lens L21 with its concave surface directed to the object side cemented with a positive lent L22 with its convex surface directed to the image side, and a double convex positive lens L23 (a fourth lens component). The filter group FL is composed of a low pass filter, an infrared (IR) cut filter, etc.

An imaging device (of which an illustration is omitted) constructed by a CCD (Charge Coupled Device), a CMOS (Complementary Metal Oxide Semiconductor), etc is disposed on an image plane I. Further, an aperture stop S is disposed between the first lens group G1 and the second lens group G2 and is fixed with respect to the first lens group G1 or the image plane I upon focusing from an infinitely distant object to a close object. Moreover, a first flare stopper FS1 and a second flare stopper FS2 are disposed anterior and posterior to the aperture stop S. Note that configurations and arrangements of the imaging device, the aperture stop S, the first flare stopper FS1 and the second flare stopper FS2 are the same as those in the respective Examples which will hereinafter be discussed.

In the imaging lens SL1 according to Example 1, upon changing, i.e., focusing from the infinitely distant object to the close object, the first lens group G1 is fixed with respect to the image plane I, while the second lens group G2 moves with respect to the image plane I, and a distance between the first lens group G1 and the second lens group G2 changes.

The following Table 1 shows values of various items of data of the imaging lens SL1 according to Example 1 of the present invention.

In (Specifications) and (Lens Group Data), f is a focal length, FNO represents an f-number, 2ω denotes an angle of view (of which the unit degree), Y stands for an image height, TL represents an total lens length of the imaging lens, BF represents a back focal length, TLa designates an air-converted total lens length of the imaging lens, BFa denotes an air conversion back focal length, and di (i is an integer) indicates a surface distance of the i-th surface, respectively. It is to be noted that β is a shooting magnification, and d0 represents a distance from the object to the lens surface closest to the object side, respectively. Herein, the total lens length TL of the imaging lens is a distance along the optical axis between the lens surface closest to the object side in the first lens group G1 and the image plane I, and the back focal length BF is a distance along the optical axis between the lens surface closest to the image side in the second lens group G2 and the image plane I.

In (Lens Surface Data) of Table 1, a surface number "i" represents an order of the lens surface counted from the object side, "r" designates a radius of curvature of the lens surface, "d" represents a distance of the lens surface, "nd" indicates a refractive index with respect to d-line (wavelength λ=587.6 nm), "vd" represents an Abbe number with respect to d-line (wavelength λ=587.56 nm), respectively. Further, "OS" designates a surface of the object, "Aperture Stop S" indicates an aperture stop S, "FS1" indicates a first flare stopper FS1, "FS2" designates a second flare stopper FS2, and an "IP" represents an image plane I, respectively. Note that a radius-of-curvature r=∞ indicates a flat surface, and a description of the air refractive index d=1.00000 is omitted. Moreover, the lens surface, if classified as an aspherical surface is asterisked such as "*" to the left side of the surface number, and a paraxial radius of curvature is given in the column of the radius-of-curvature r.

(Aspherical Surface Data) shows a paraxial-radius-of-curvature r, a cone constant κ and aspherical surface coefficients C4-C10 with respect to the aspherical surfaces given in the (Lens Surface Data) in the case of expressing shapes thereof in the following expression:

$$S(y) = (y^2/r)/(1+(1-\kappa(y^2/r^2))^{1/2}) + C4 \times y^4 + C6 \times y^6 + C8 \times y^8 + C10 \times y^{10}$$

where y is a height in a direction vertical to the optical axis, S(y) is a distance (sag amount) along the optical axis from a tangent plane of a vertex of each aspherical surface at the height y to each aspherical surface, r is a radius of curvature (paraxial radius of curvature) of the reference sphere, κ is a conical coefficient, and Cn (n is an integer) is an n-th order aspherical coefficient. Note that a secondary aspherical coefficient C2 is "0" (zero). In (Aspherical Surface Data), "E-n" denotes "×10$^{-n}$", in which "n" is an integer, and for example "1.234E-05" denotes "1.234×10$^{-5}$".

In (Variable distance), "INF" denotes a state the shooting distance is infinity, note that a shooting distance at the near-distance object focusing time "CLD" is a distance up to the object when the shooting magnification is on the order of −1/30, and this value is similarly applied to the respective Examples that will be discussed later on.

In (Lens Group Data), "S" denotes a starting surface number.

Herein, the focal length f, the radius-of-curvature r and other items of data involve using generally [mm] as the unit of the length. The optical system, however, acquires the equal optical performance even when proportionally enlarged or reduced and is not therefore limited to this unit.

Note that the symbols described above in the Table 1 are to be used in the same way in the Tables of the respective Examples which will be discussed later on.

TABLE 1

(Specifications)

f = 36.20
FNO = 2.95
2ω = 62.67
Y = 21.60
TL = 67.39
BF = 39.49
TLa = 66.70
Bfa = 38.81

(Lens Surface Data)

| i | r | d | nd | νd |
|---|---|---|---|---|
| OS | ∞ | | | |
| *1 | 24.2544 | 2.20 | 1.67790 | 54.89 |
| *2 | 11.6621 | 1.35 | | |
| 3 | 16.4363 | 2.45 | 1.88300 | 40.76 |
| 4 | 46.2388 | 0.60 | | |
| 5 | ∞ | 2.60 | Flare Stopper FS1 | |
| 6 | ∞ | (d6) | Aperture Stop S | |
| 7 | ∞ | 3.10 | Flare Stopper FS2 | |
| 8 | −10.8832 | 1.80 | 1.80810 | 22.76 |
| 9 | −24.2875 | 5.00 | 1.75500 | 52.32 |

TABLE 1-continued

| 10 | −13.2442 | 0.20 | | |
|---|---|---|---|---|
| 11 | 87.6191 | 4.55 | 1.59319 | 67.87 |
| *12 | −46.9312 | (d12) | | |
| 13 | ∞ | 2.00 | 1.51680 | 64.10 |
| 14 | ∞ | (d14) | | |
| IP | ∞ | | | |

(Aspherical Surface Data)

Surface Number: 1 r = 24.2544
κ = +1.6856
C4 = +0.00000E+00
C6 = +0.00000E+00
C8 = +0.00000E+00
C10 = +0.00000E+00

Surface Number: 2 r = 11.6621
κ = +1.6736
C4 = −6.8586E−05
C6 = −9.4226E−07
C8 = +7.6823E−09
C10 = −2.6651E−10

Surface Number: 12 r = −46.9312
κ = +7.9227
C4 = +2.0738E−05
C6 = +1.9140E−09
C8 = +2.2006E−10
C10 = −2.5793E−13

(Variable Distances)

| | INF | CLD |
|---|---|---|
| β = | 0 | −0.0333 |
| d0 = | ∞ | 1089.1255 |
| d6 = | 4.0423 | 2.7579 |
| d12 = | 36.4934 | 37.7777 |
| d14 = | 1.0000 | 1.0000 |

(Lens Group Data)

| Group | S | Focal Length |
|---|---|---|
| 1 | 1 | 137.7575 |
| 2 | 8 | 39.2741 |

(Values for Conditional Expressions)

f = 36.2005
f1 = 137.7575
f2 = 39.2741
Po = 69.4253
TLa = 66.7000
Σd = 27.8923
Σd2 = 11.5500
(1) Po/(TLa − Σd) = 1.7888
(2) TLa/Σd = 2.3915
(3) TLa/f = 1.8426
(4) TLa/Σd2 = 5.7753
(5) f/f2 = 0.9217
(6) f1/f2 = 3.5076

Figure 2B:
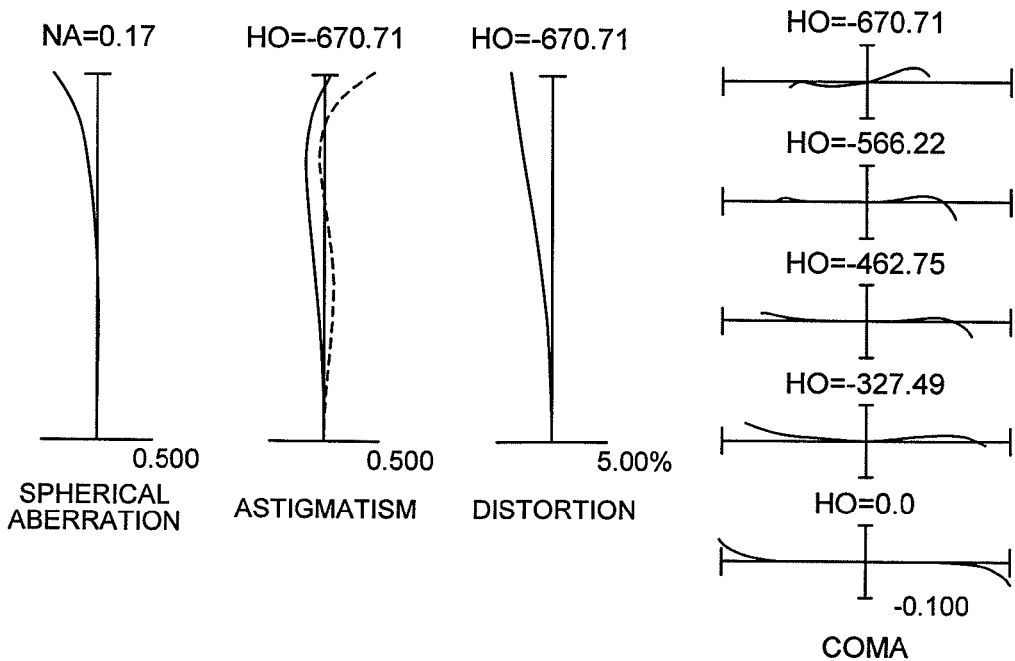

FIGS. 2A and 2B are graphs showing various aberrations of the imaging lens SL1 according to Example 1 of the present invention upon focusing on an infinitely distant object and a close object, respectively.

Note that FNO represents an f-number, and A denotes a half angle of view respectively in these aberration diagrams. Further, in the aberration diagram showing astigmatism, a solid line represents a sagittal image plane, and a broken line represents a meridional image plane. Note that the same symbols as those in Example 1 are to be employed also in the diagrams showing the various aberrations in the Examples which will be illustrated as below.

As apparent from the respective aberration graphs, in Example 1, it is understood that the various aberrations are preferably corrected from an infinite-distance focusing state to a near-distance focusing state, and the excellent image forming performance is exhibited.

It should be noted that Example 1 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 2

FIG. 3 is a view showing a lens configuration of an imaging lens SL2 according to Example 2 of the present invention.

As illustrated in FIG. 3, the imaging lens SL2 according to Example 2 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a negative meniscus lens L11 (the first lens component) with its convex surface directed to the object side and a positive meniscus lens L12 (the second lens component) with its convex surface directed to the object side. The second lens group G2 is composed of a cemented lens (the third lens component) constructed by a negative lens L21 with its concave surface directed to the object side cemented with a positive lent L22 with its convex surface directed to the image side, and a double convex positive lens L23 (the fourth lens component). The filter group FL is composed of a low-pass filter, an IR cut filter, etc.

In the imaging lens SL2 according to Example 2, upon changing, i.e., focusing from an infinitely distant object to a close object, the first lens group G1 is fixed with respect to the image plane I, while the second lens group G2 moves with respect to the image plane I, and a distance between the first lens group G1 and the second lens group G2 changes.

The following Table 2 shows the values of various items of data of the imaging lens SL2 according to Example 2 of the present invention.

TABLE 2

(Specifications)

f = 36.05
FNO = 2.92
2ω = 62.94
Y = 21.60
TL = 71.32
BF = 41.39
TLa = 70.61
Bfa = 40.68

(Lens Surface Data)

| i | r | d | nd | νd |
|---|---|---|---|---|
| OS | ∞ | | | |
| *1 | 26.8460 | 2.20 | 1.67790 | 54.89 |
| *2 | 12.5040 | 2.00 | | |

TABLE 2-continued

| 3 | 18.8091 | 2.30 | 1.88300 | 40.76 |
|---|---|---|---|---|
| 4 | 58.5951 | 0.70 | | |
| 5 | ∞ | 3.30 | Flare Stopper FS1 | |
| 6 | ∞ | (d6) | Aperture Stop S | |
| 7 | ∞ | 3.25 | Flare Stopper FS2 | |
| 8 | −11.6610 | 1.95 | 1.80810 | 22.76 |
| 9 | −28.1390 | 5.35 | 1.75500 | 52.32 |
| 10 | −14.0532 | 0.20 | | |
| 11 | 96.6797 | 4.60 | 1.59319 | 67.05 |
| *12 | −45.3228 | (d12) | | |
| 13 | ∞ | 2.00 | 1.51680 | 64.12 |
| 14 | ∞ | (d14) | | |
| IP | ∞ | | | |

(Aspherical Surface Data)

Surface Number: 1 r = 26.8460
κ = +2.0650
C4 = +0.00000E+00
C6 = +0.00000E+00
C8 = +0.00000E+00
C10 = +0.00000E+00

Surface Number: 2 r = 12.5040
κ = +1.8211
C4 = −5.9269E−05
C6 = −9.5098E−07
C8 = +9.7775E−09
C10 = −2.2897E−10

Surface Number: 12 r = −45.3228
κ = +7.1423
C4 = +1.9195E−05
C6 = +9.0461E−09
C8 = +1.4126E−10
C10 = −5.3447E−14

(Variable Distances)

| | INF | CLD |
|---|---|---|
| β = | 0 | −0.0333 |
| d0 = | ∞ | 1084.4198 |
| d6 = | 4.0805 | 2.8333 |
| d12 = | 38.2938 | 39.5411 |
| d14 = | 1.0000 | 1.0000 |

(Lens Group Data)

| Group | S | Focal Length |
|---|---|---|
| 1 | 1 | 173.4140 |
| 2 | 8 | 38.9379 |

(Values for Conditional Expressions)

f = 36.0500
f1 = 173.4140
f2 = 38.9379
Po = 73.3720
TLa = 70.6100
Σd = 29.9305
Σd2 = 12.1000
(1) Po/(TLa − Σd) = 1.8037
(2) TLa/Σd = 2.3591
(3) TLa/f = 1.9586
(4) TLa/Σd2 = 5.8354
(5) f/f2 = 0.9258
(6) f1/f2 = 4.4536

Figure 4A:
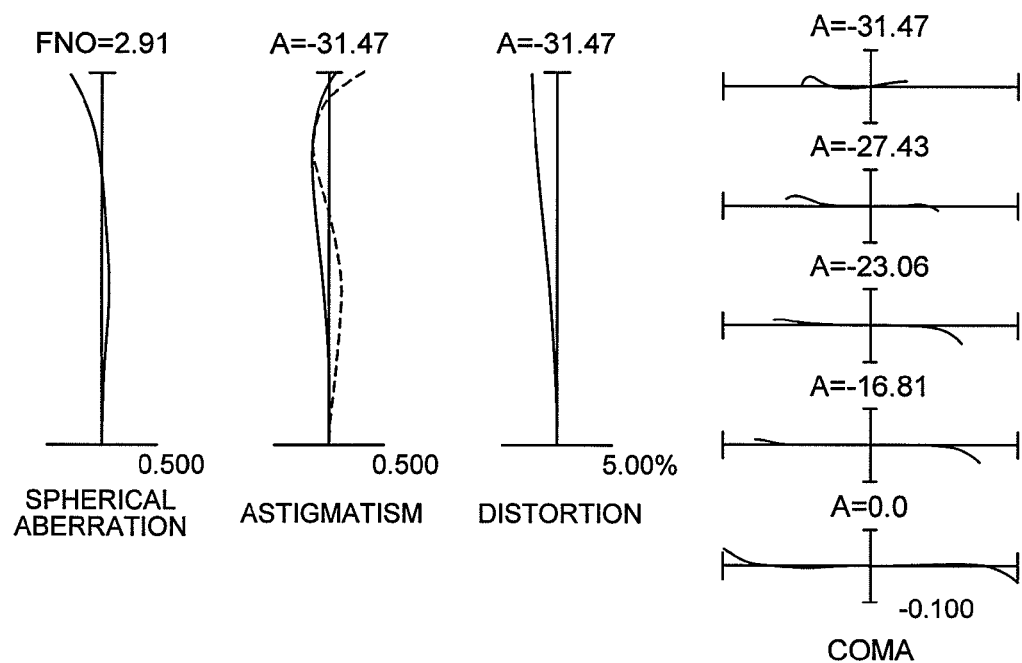
Figure 4B:
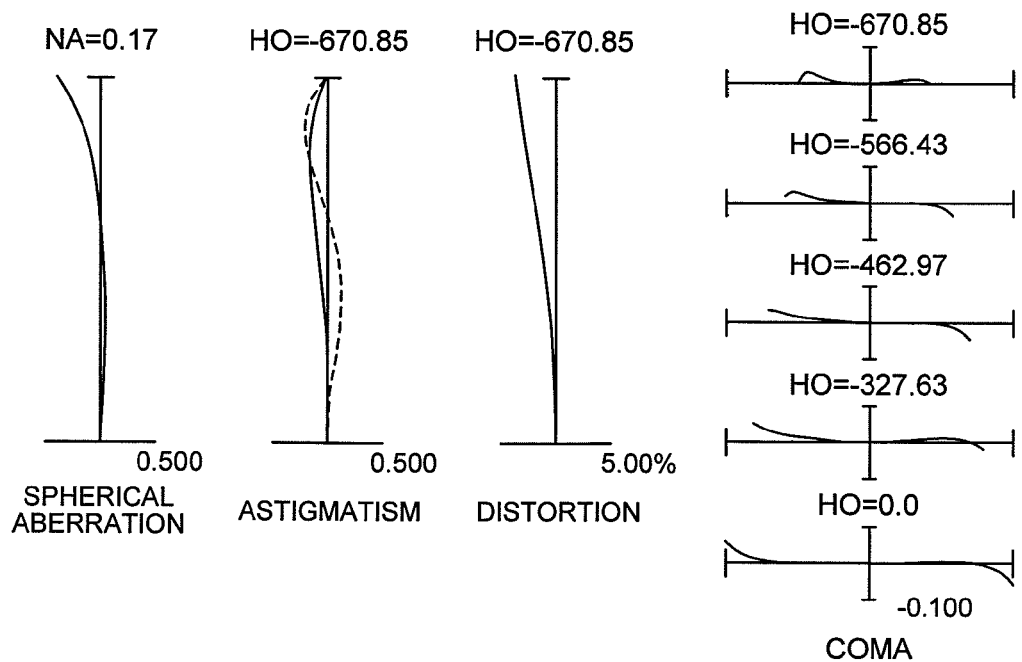

FIGS. 4A and 4B are graphs showing various aberrations of the imaging lens SL2 according to Example 2 of the present invention upon focusing on an infinitely distant object and a close object, respectively.

As apparent from the respective aberration graphs, in Example 2, it is understood that the various aberrations are preferably corrected from an infinite-distance focusing state to a near-distance focusing state, and the excellent image forming performance is exhibited.

It should be noted that Example 2 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 3

FIG. 5 is a sectional view showing a lens configuration of an imaging lens SL3 according to Example 3 of the present invention.

As illustrated in FIG. 5, the imaging lens SL3 according to Example 3 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a negative meniscus lens L11 (the first lens component) with its convex surface directed to the object side and a positive meniscus lens L12 (the second lens component) with its convex surface directed to the object side. The second lens group G2 is composed of a cemented lens (the third lens component) constructed by a negative lens L21 with its concave surface directed to the object side cemented with a positive lent L22 with its convex surface directed to the image side, and a double convex positive lens L23 (the fourth lens component). The filter group FL is composed of a low-pass filter, an IR cut filter, etc.

In the imaging lens SL3 according to Example 3, upon changing, i.e., focusing from an infinitely distant object to a close object, the first lens group G1 is fixed with respect to the image plane I, while the second lens group G2 moves with respect to the image plane I, and a distance between the first lens group G1 and the second lens group G2 changes.

The following Table 3 shows the values of various items of data of the imaging lens SL3 according to Example 3 of the present invention.

TABLE 3

(Specifications)

f = 36.05
FNO = 2.91
2ω = 62.99
Y = 21.60
TL = 71.30
BF = 44.02
TLa = 70.58
Bfa = 40.08

(Lens Surface Data)

| i | r | d | nd | vd |
|---|---|---|---|---|
| OS | ∞ | | | |
| 1 | 34.2747 | 2.10 | 1.67790 | 54.89 |
| *2 | 14.1110 | 2.00 | | |
| 3 | 19.7895 | 2.65 | 1.88300 | 40.76 |

TABLE 3-continued

| 4 | 79.4375 | 0.70 | | |
|---|---|---|---|---|
| 5 | ∞ | 3.60 | Flare Stopper FS1 | |
| 6 | ∞ | (d6) | Aperture Stop S | |
| 7 | ∞ | 3.27 | Flare Stopper FS2 | |
| 8 | −11.4798 | 1.95 | 1.80810 | 22.76 |
| 9 | −26.9229 | 5.30 | 1.75500 | 52.32 |
| 10 | −14.6124 | 0.20 | | |
| 11 | 147.4150 | 4.50 | 1.59319 | 67.87 |
| *12 | −34.8052 | (d12) | | |
| 13 | ∞ | 2.11 | 1.51680 | 64.11 |
| 14 | ∞ | (d14) | | |
| IP | ∞ | | | |

(Aspherical Surface Data)

Surface Number: 2 r = 14.1110
κ = +2.2287
C4 = −6.2840E−05
C6 = −1.0445E−06
C8 = +1.1115E−08
C10 = −2.0188E−10

Surface Number: 12 r = −34.8052
κ = −4.4403
C4 = −6.1480E−06
C6 = +2.4888E−08
C8 = +0.00000E+00
C10 = +0.00000E+00

(Variable Distances)

| | INF | CLD |
|---|---|---|
| β = | 0 | −0.0333 |
| d0 = | ∞ | 1081.5355 |
| d6 = | 4.2323 | 2.9425 |
| d12 = | 37.6932 | 38.9831 |
| d14 = | 1.0000 | 1.0000 |

(Lens Group Data)

| Group | S | Focal Length |
|---|---|---|
| 1 | 1 | 129.6905 |
| 2 | 8 | 40.2571 |

(Values for Conditional Expressions)

f = 36.0500
f1 = 129.6905
f2 = 40.2571
Po = 73.8143
TLa = 70.5800
Σd = 30.5000
Σd2 = 11.9500
(1) Po/(TLa − Σd) = 1.8415
(2) TLa/Σd = 2.3142
(3) TLa/f = 1.9579
(4) TLa/Σd2 = 5.9065
(5) f/f2 = 0.8955
(6) f1/f2 = 3.2216

Figure 6A:
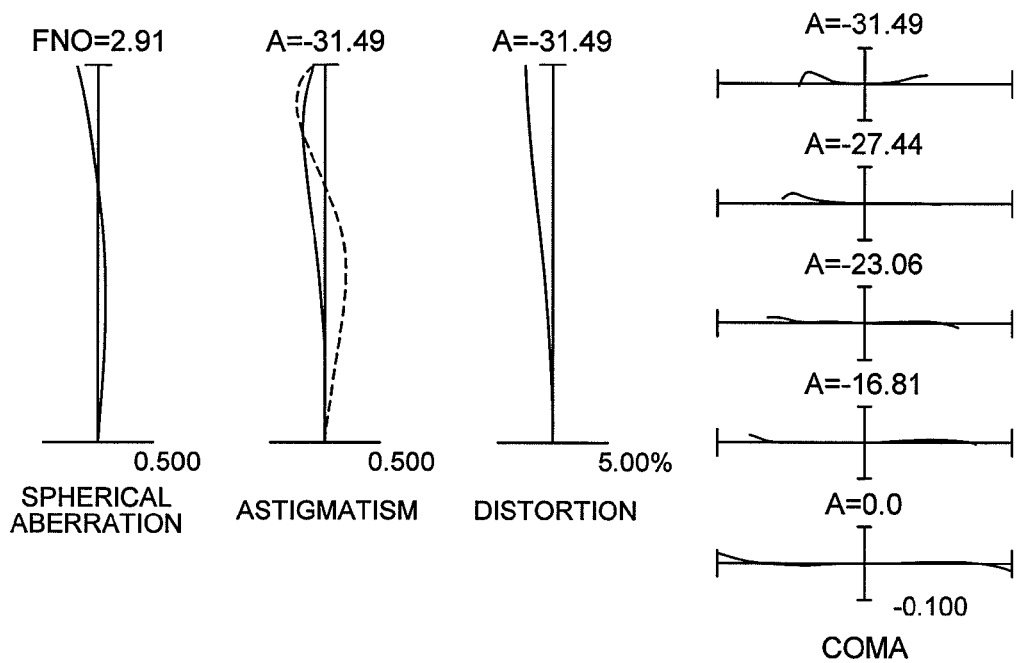
Figure 6B:
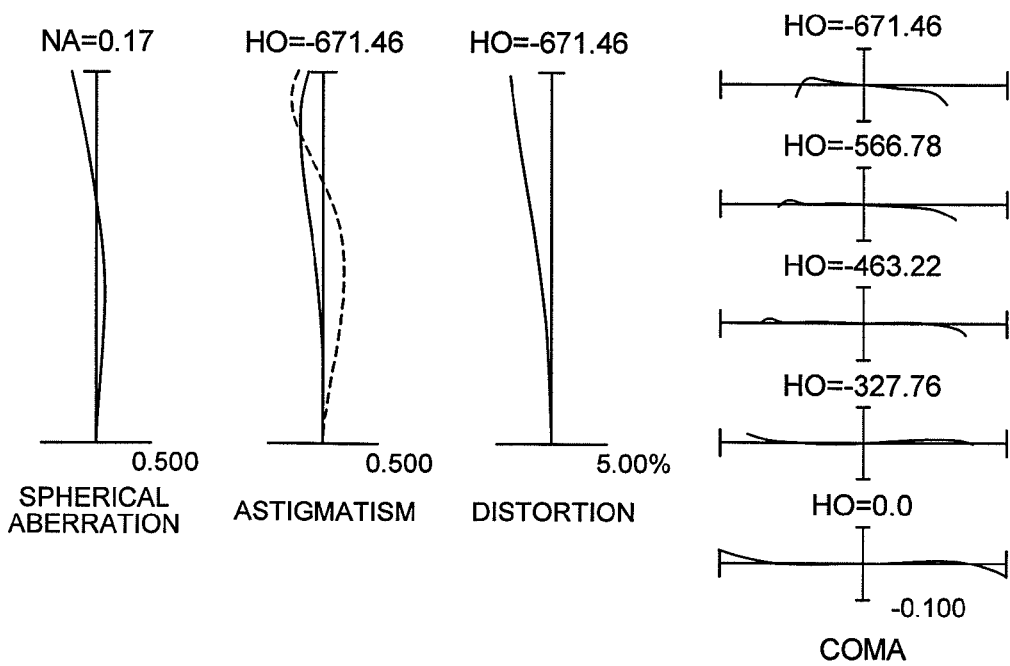

FIGS. 6A and 6B are graphs showing various aberrations of the imaging lens SL3 according to Example 3 of the present invention upon focusing on an infinitely distant object and a close object, respectively.

As apparent from the respective aberration graphs, in Example 3, it is understood that the various aberrations are preferably corrected from an infinite-distance focusing state to a near-distance focusing state, and the excellent optical performance is exhibited.

It should be noted that Example 3 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 4

FIG. 7 is a sectional view showing a lens configuration of an imaging lens SL4 according to Example 4 of the present invention.

As illustrated in FIG. 7, the imaging lens SL4 according to Example 4 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a negative meniscus lens L11 (the first lens component) with its convex surface directed to the object side and a positive meniscus lens L12 (the second lens component) with its convex surface directed to the object side. The second lens group G2 is composed of a cemented lens (the third lens component) constructed by a negative lens L21 with its concave surface directed to the object side cemented with a positive lent L22 with its convex surface directed to the image side, and a double convex positive lens L23 (the fourth lens component). The filter group FL is composed of a low-pass filter, an IR cut filter, etc.

In the imaging lens SL4 according to Example 4, upon changing, i.e., focusing from an infinitely distant object to a close object, the first lens group G1 is fixed with respect to the image plane I, while the second lens group G2 moves with respect to the image plane I, and a distance between the first lens group G1 and the second lens group G2 changes.

The following Table 4 shows the values of various items of data of the imaging lens SL4 according to Example 4 of the present invention.

TABLE 4

(Specifications)

f = 36.05
FNO = 2.91
2ω = 62.99
Y = 21.60
TL = 71.50
BF = 40.80
TLa = 70.78
Bfa = 40.08

(Lens Surface Data)

| i | r | d | nd | νd |
|---|---|---|---|---|
| OS | ∞ | | | |
| 1 | 31.7806 | 1.80 | 1.69350 | 53.18 |
| *2 | 14.0003 | 2.00 | | |
| 3 | 19.5039 | 2.25 | 1.88300 | 40.76 |
| 4 | 69.7968 | 0.68 | | |
| 5 | ∞ | 4.71 | Flare Stopper FS1 | |
| 6 | ∞ | (d6) | Aperture Stop S | |
| 7 | ∞ | 3.27 | Flare Stopper FS2 | |
| 8 | −11.5058 | 1.95 | 1.80810 | 22.76 |
| 9 | −25.1369 | 5.30 | 1.75500 | 52.32 |
| 10 | −14.6493 | 0.20 | | |

TABLE 4-continued

| 11 | 124.7523 | 4.51 | 1.59319 | 67.87 |
|---|---|---|---|---|
| *12 | −35.9919 | (d12) | | |
| 13 | ∞ | 2.10 | 1.51680 | 64.11 |
| 14 | ∞ | (d14) | | |
| IP | ∞ | | | |

(Aspherical Surface Data)

Surface Number: 2 r = 14.0003
κ = +2.0550
C4 = −5.5801E−05
C6 = −9.3340E−07
C8 = +9.2870E−09
C10 = −1.5473E−10

Surface Number: 12 r = −35.9919
κ = −4.1870
C4 = −4.0077E−06
C6 = +1.9288E−08
C8 = +0.0000E+00
C10 = +0.0000E+00

(Variable Distances)

| | INF | CLD |
|---|---|---|
| β = | 0 | −0.0333 |
| d0 = | ∞ | 1081.4892 |
| d6 = | 4.0386 | 2.7583 |
| d12 = | 37.6981 | 38.9785 |
| d14 = | 1.0000 | 1.0000 |

(Lens Group Data)

| Group | S | Focal Length |
|---|---|---|
| 1 | 1 | 136.2844 |
| 2 | 8 | 39.8788 |

(Values for Conditional Expressions)

f = 36.0500
f1 = 136.2844
f2 = 39.8788
Po = 72.9392
TLa = 70.7800
Σd = 30.7000
Σd2 = 11.9575
(1) Po/(TLa − Σd) = 1.8197
(2) TLa/Σd = 2.3056
(3) TLa/f = 1.9635
(4) TLa/Σd2 = 5.9195
(5) f/f2 = 0.9040
(6) f1/f2 = 3.4175

Figure 8A:
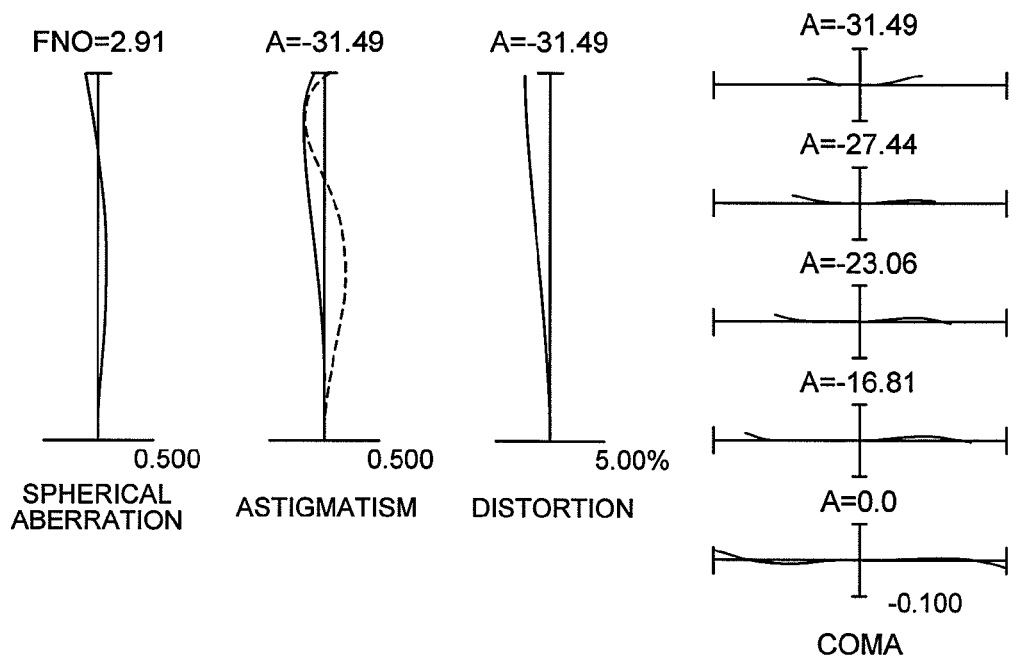
Figure 8B:
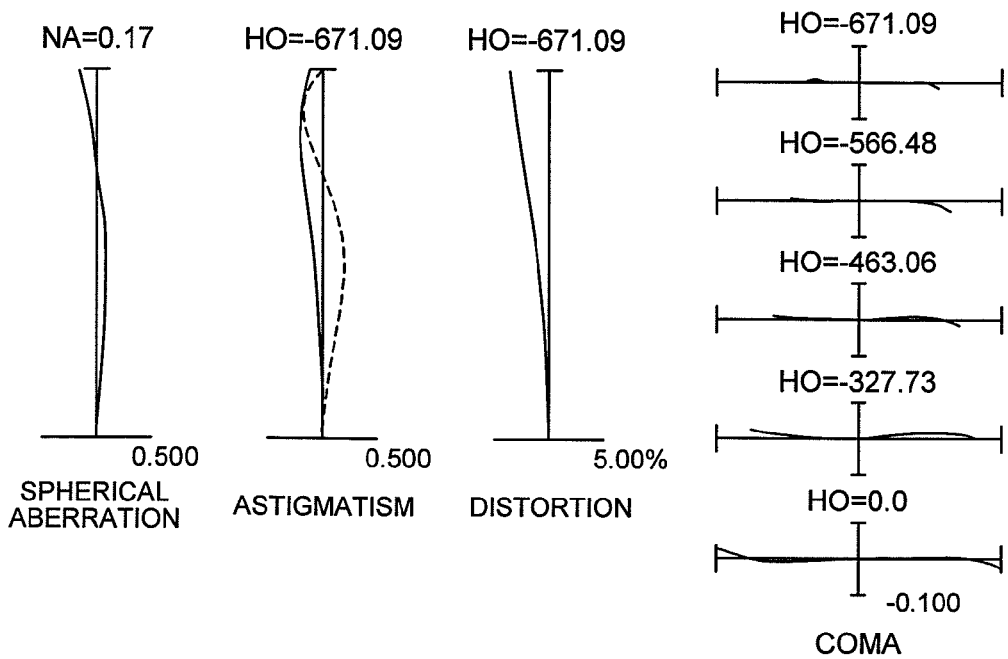

FIGS. 8A and 8B are graphs showing various aberrations of the imaging lens SL4 according to Example 4 of the present invention upon focusing on an infinitely distant object and a close object, respectively.

As apparent from the respective aberration graphs, in Example 4, it is understood that the various aberrations are preferably corrected from an infinite-distance focusing state to a near-distance focusing state, and the excellent optical performance is exhibited.

It should be noted that Example 4 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 5

FIG. 9 is an sectional view showing a lens configuration of an imaging lens SL5 according to Example 5 of the present invention.

As illustrated in FIG. 9, the imaging lens SL5 according to Example 5 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a positive lens L11 (the first lens component) with its convex surface directed to the object side, a negative meniscus lens L12 (the second lens component) with its convex surface directed to the object side, and a positive meniscus lens L13 (a third lens component) with its convex surface directed to the object side. The second lens group G2 is composed of a cemented lens (a fourth lens component) constructed by a negative lens L21 with its concave surface directed to the object side cemented with a positive lent L22 with its convex surface directed to the image side, and a double convex positive lens L23 (a fifth lens component). The filter group FL is composed of a low-pass filter, an IR cut filter, etc.

In the imaging lens SL5 according to Example 5, upon changing (i.e., focusing) from an infinitely distant object to a close object, the first lens group G1 is fixed with respect to the image plane I, while the second lens group G2 moves with respect to the image plane I, and a distance between the first lens group G1 and the second lens group G2 changes.

The following Table 5 shows the values of various items of data of the imaging lens SL5 according to Example 5 of the present invention.

TABLE 5

(Specifications)

f = 36.05
FNO = 2.91
2ω = 63.02
Y = 21.60
TL = 71.24
BF = 40.81
TLa = 70.53
Bfa = 40.10

(Lens Surface Data)

| i | r | d | nd | νd |
|---|---|---|---|---|
| OS | ∞ | | | |
| 1 | 1000.0000 | 1.45 | 1.67790 | 55.34 |
| 2 | −222.8453 | 0.20 | | |
| 3 | 32.7810 | 1.60 | 1.67790 | 54.89 |
| *4 | 12.9777 | 1.64 | | |
| 5 | 17.1150 | 2.17 | 1.88300 | 40.76 |
| 6 | 45.0372 | 0.70 | | |
| 7 | ∞ | 3.60 | Flare Stopper FS1 | |
| 8 | ∞ | (d8) | Aperture Stop S | |
| 9 | ∞ | 3.27 | Flare Stopper FS2 | |
| 10 | −11.5810 | 1.89 | 1.80810 | 22.76 |
| 11 | −27.2670 | 5.22 | 1.75500 | 52.32 |
| 12 | −14.5807 | 0.20 | | |
| 13 | 140.8767 | 4.54 | 1.59319 | 67.87 |
| *14 | −34.1907 | (d14) | | |

TABLE 5-continued

| 15 | ∞ | 2.10 | 1.51680 | 64.11 |
|---|---|---|---|---|
| 16 | ∞ | (d16) | | |
| IP | ∞ | | | |

(Aspherical Surface Data)

Surface Number: 4 r = 12.9777
κ = +1.9418
C4 = −6.4717E−05
C6 = −8.5881E−07
C8 = +6.5859E−09
C10 = −1.9212E−10

Surface Number: 14 r = −34.1907
κ = −14.9618
C4 = −3.8197E−05
C6 = +2.2111E−07
C8 = −7.7265E−10
C10 = +1.3614E−12

(Variable Distances)

| | INF | CLD |
|---|---|---|
| β = | 0 | −0.0333 |
| d0 = | ∞ | 1082.8665 |
| d8 = | 3.9533 | 2.6899 |
| d14 = | 37.7119 | 38.9753 |
| d16 = | 1.0000 | 1.0000 |

(Lens Group Data)

| Group | S | Focal Length |
|---|---|---|
| 1 | 1 | 151.5718 |
| 2 | 10 | 39.0656 |

(Values for Conditional Expressions)

f = 36.0500
f1 = 151.5718
f2 = 39.0656
Po = 72.5918
TLa = 70.5300
Σd = 30.4930
Σd2 = 11.8521
(1) Po/(TLa − Σd) = 1.8133
(2) TLa/Σd = 2.3129
(3) TLa/f = 1.9563
(4) TLa/Σd2 = 5.9505
(5) f/f2 = 0.9228
(6) f1/f2 = 3.8799

Figure 10A:
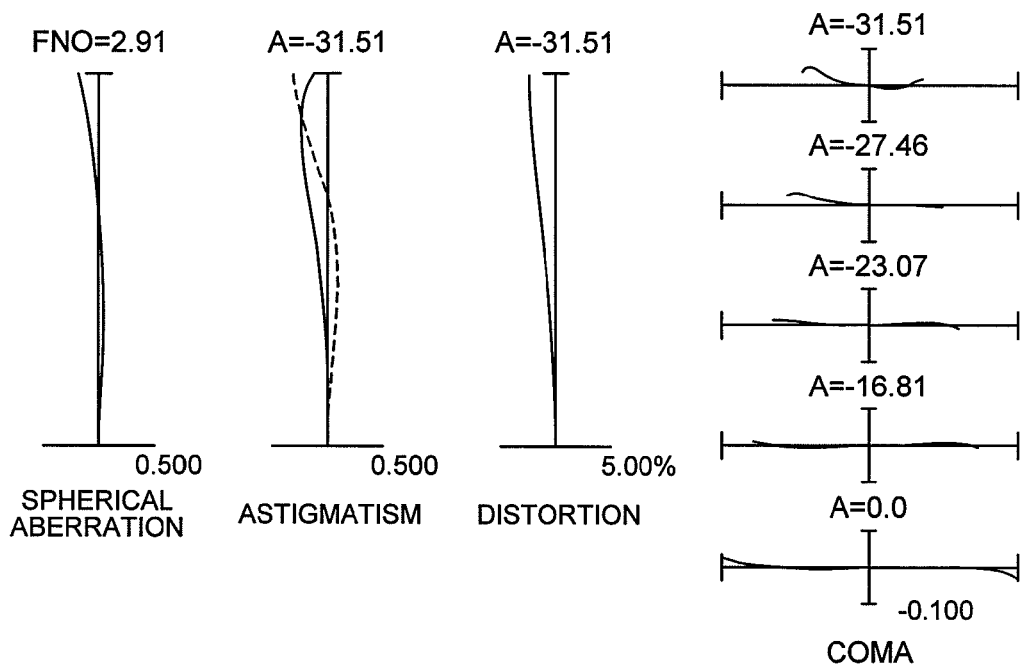
Figure 10B:
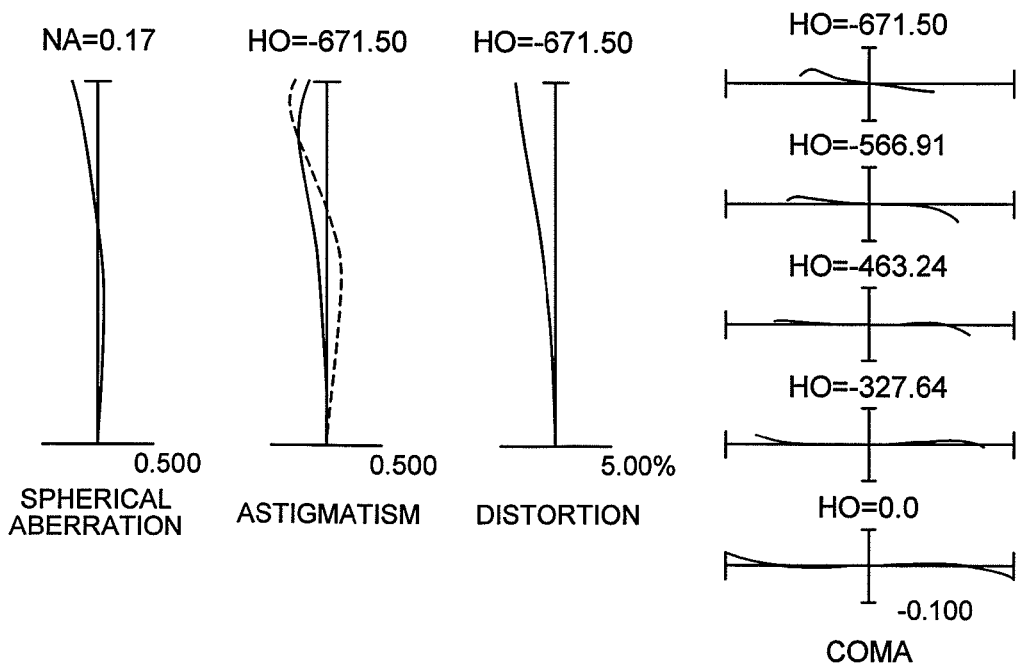

FIGS. 10A and 10B are graphs showing various aberrations of the imaging lens SL5 according to Example 5 of the present invention upon focusing on an infinitely distant object and a close object, respectively.

As apparent from the respective aberration graphs, in Example 5, it is understood that the various aberrations are preferably corrected from an infinite-distance focusing state to a near-distance focusing state, and the excellent optical performance is exhibited.

It should be noted that Example 5 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 6

FIG. 11 is a sectional view showing a lens configuration of an imaging lens SL6 according to Example 6 of the present invention.

As illustrated in FIG. 11, the imaging lens SL6 according to Example 6 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a positive lens L11 (the first lens component) with its convex surface directed to the object side, a negative meniscus lens L12 (the second lens component) with its convex surface directed to the object side, and a positive meniscus lens L13 (the third lens component) with its convex surface directed to the object side. The second lens group G2 is composed of a cemented lens (the fourth lens component) constructed by a negative lens L21 with its concave surface directed to the object side cemented with a positive lens L22 with its convex surface directed to the image side, and a double convex positive lens L23 (the fifth lens component). The filter group FL is composed of a low-pass filter, an IR cut filter, etc.

In the imaging lens SL6 according to Example 6, upon changing, i.e., focusing, from an infinitely distant object to a close object, the first lens group G1 is fixed with respect to the image plane I, while the second lens group G2 moves with respect to the image plane I, and a distance between the first lens group G1 and the second lens group G2 changes.

The following Table 6 shows values of various items of data of the imaging lens SL6 according to Example 6 of the present invention.

TABLE 6

(Specifications)

f = 36.05
FNO = 2.91
2ω = 62.99
Y = 21.60
TL = 71.34
BF = 40.87
TLa = 70.66
Bfa = 40.19

(Lens Surface Data)

| i | r | d | nd | vd |
|---|---|---|---|---|
| OS | ∞ | | | |
| 1 | 1000.0000 | 1.40 | 1.67790 | 55.34 |
| 2 | −282.3273 | 0.20 | | |
| 3 | 30.6825 | 1.50 | 1.69350 | 54.18 |
| *4 | 12.7801 | 1.55 | | |
| 5 | 16.9788 | 2.15 | 1.88300 | 40.76 |
| 6 | 45.4748 | 0.70 | | |
| 7 | ∞ | 3.60 | Flare Stopper FS1 | |
| 8 | ∞ | (d8) | Aperture Stop S | |
| 9 | ∞ | 3.27 | Flare Stopper FS2 | |
| 10 | −11.4350 | 1.90 | 1.80810 | 22.76 |
| 11 | −27.1985 | 5.20 | 1.75500 | 52.32 |
| 12 | −14.4115 | 0.20 | | |
| 13 | 129.8333 | 4.60 | 1.59319 | 67.87 |
| *14 | −34.8830 | (d14) | | |
| 15 | ∞ | 2.00 | 1.51680 | 64.11 |
| 16 | ∞ | (d16) | | |
| IP | ∞ | | | |

TABLE 6-continued (Aspherical Surface Data)

Surface Number: 4 r = 12.7801
κ = −0.2080
C4 = +5.1449E−05
C6 = +2.8997E−07
C8 = −3.7095E−09
C10 = +2.4546E−11

Surface Number: 14 r = −34.8830
κ = −19.0000
C4 = −4.5892E−05
C6 = +2.9493E−07
C8 = −1.1303E−09
C10 = +2.0473E−12

(Variable Distances)

| | INF | CLD |
|---|---|---|
| β = | 0 | −0.0333 |
| d0 = | ∞ | 1082.9095 |
| d8 = | 4.1997 | 2.9395 |
| d14 = | 37.8698 | 39.1300 |
| d16 = | 1.0000 | 1.0000 |

(Lens Group Data)

| Group | S | Focal Length |
|---|---|---|
| 1 | 1 | 155.1717 |
| 2 | 10 | 38.8915 |

(Values for Conditional Expressions)

f = 36.0500
f1 = 155.1717
f2 = 38.8915
Po = 74.0010
TLa = 70.6600
Σd = 30.4674
Σd2 = 11.9000
(1) Po/(TLa − Σd) = 1.8414
(2) TLa/Σd = 2.3191
(3) TLa/f = 1.9599
(4) TLa/Σd2 = 5.9375
(5) f/f2 = 0.9269
(6) f1/f2 = 3.9899

Figure 12A:
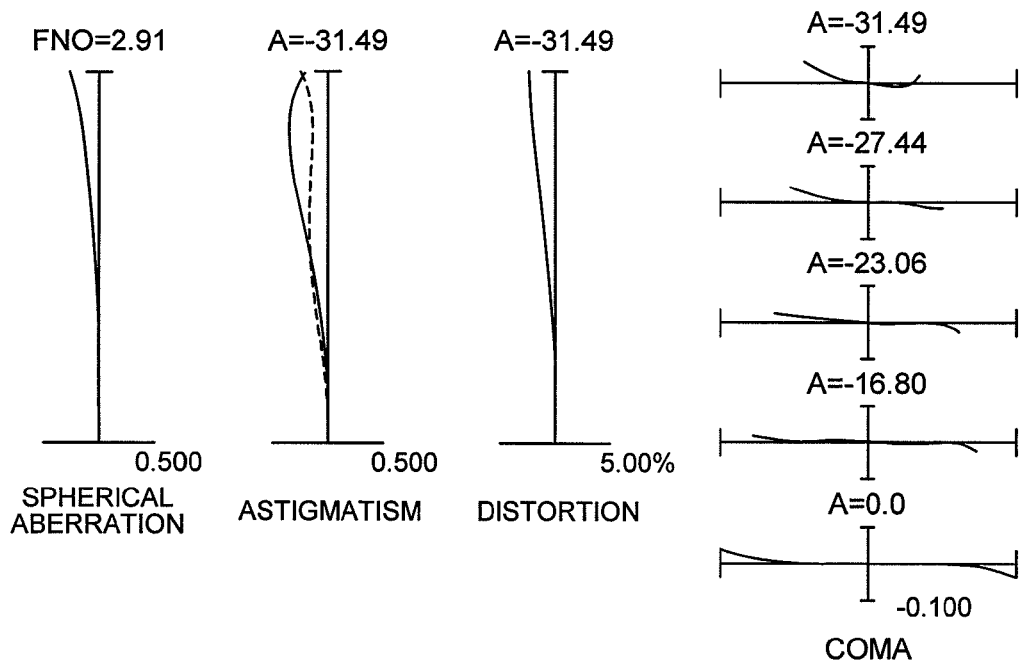
Figure 12B:
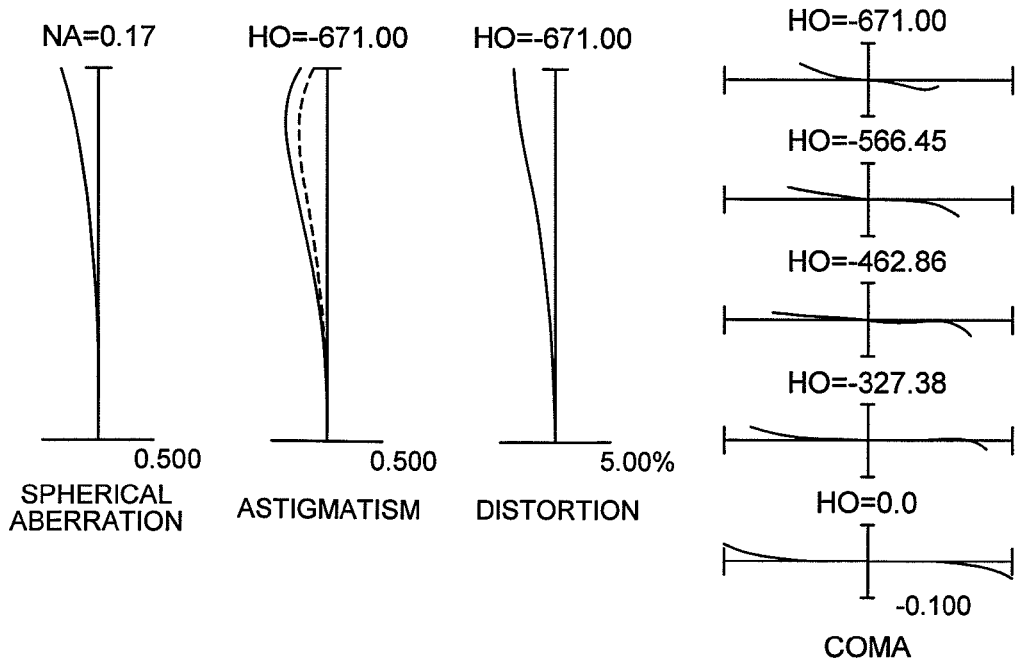

FIGS. 12A and 12B are graphs showing various aberrations of the imaging lens SL6 according to Example 6 of the present invention upon focusing on an infinitely distant object and a close object, respectively.

As apparent from the respective aberration graphs, in Example 6, it is understood that the various aberrations are preferably corrected from an infinite-distance focusing state to a near-distance focusing state, and the excellent optical performance is exhibited.

It should be noted that Example 6 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 7

Figure 13:
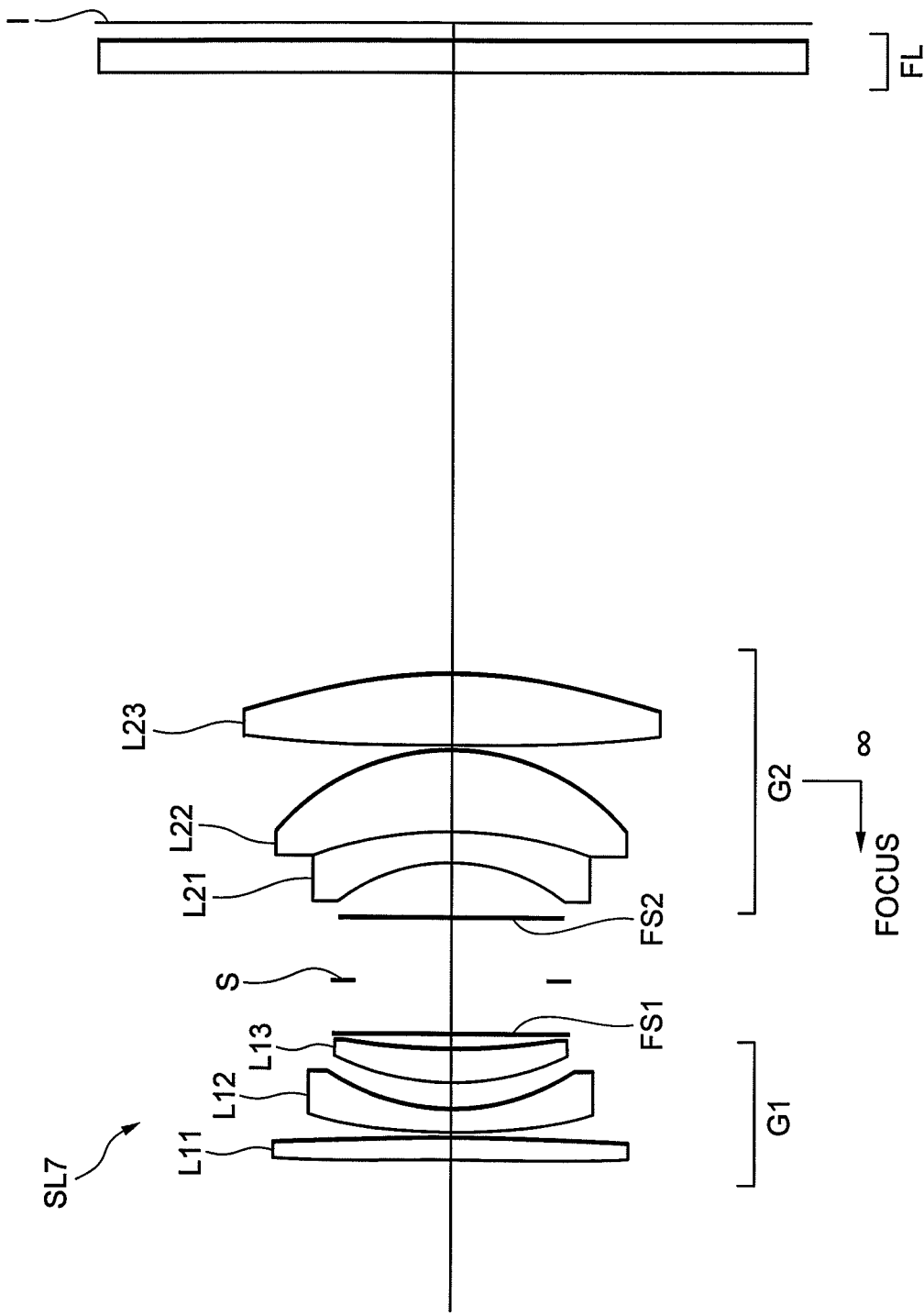
FIG. 13 is a sectional view showing a lens configuration of an imaging lens according to Example 7.

FIG. 13 is a sectional view showing a lens configuration of an imaging lens SL7 according to Example 7 of the present invention.

As illustrated in FIG. 13, the imaging lens SL7 according to Example 7 is composed of, in order from an unillustrated object side, a first lens group G1 having the positive refractive power, a second lens group G2 spaced with an air distance from the first lens group G1 and having positive refractive power and a filter group FL spaced with an air distance from the second lens group G2.

The first lens group G1 is composed of, in order from the object side, a positive lens L11 (the first lens component) with its convex surface directed to the object side, a negative meniscus lens L12 (the second lens component) with its convex surface directed to the object side, and a positive meniscus lens L13 (the third lens component) with its convex surface directed to the object side. The second lens group G2 is composed of a cemented lens (the fourth lens component) constructed by a negative lens L21 with its concave surface directed to the object side cemented with a positive lent L22 with its convex surface directed to the image side, and a double convex positive lens L23 (the fifth lens component). The filter group FL is composed of a low-pass filter, an IR cut filter, etc.

In the imaging lens SL7 according to Example 7, upon changing, i.e., focusing, from an infinitely distant object to a close object, the first lens group G1 is fixed with respect to the image plane I, while the second lens group G2 moves with respect to the image plane I, and a distance between the first lens group G1 and the second lens group G2 changes.

The following Table 7 shows the values of various items of data of the imaging lens SL7 according to Example 7 of the present invention.

TABLE 7

(Specifications)

f = 36.05
FNO = 2.91
2ω = 62.99
Y = 21.60
TL = 71.32
BF = 40.82
TLa = 70.64
Bfa = 40.14

(Lens Surface Data)

| i | r | d | nd | νd |
|---|---|---|---|---|
| OS | ∞ | | | |
| 1 | 148.0320 | 1.45 | 1.65844 | 50.88 |
| 2 | −1000.0000 | 0.20 | | |
| 3 | 36.6441 | 1.50 | 1.67790 | 54.89 |
| *4 | 13.0802 | 1.60 | | |
| 5 | 17.1339 | 2.15 | 1.88300 | 40.76 |
| 6 | 45.5254 | 0.70 | | |
| 7 | ∞ | 3.60 | Flare Stopper FS1 | |
| 8 | ∞ | (d8) | Aperture Stop S | |
| 9 | ∞ | 3.27 | Flare Stopper FS2 | |
| 10 | −11.5288 | 1.85 | 1.80810 | 22.76 |
| 11 | −26.9158 | 5.20 | 1.75500 | 52.32 |
| 12 | −14.4831 | 0.20 | | |
| 13 | 131.6245 | 4.60 | 1.59319 | 67.87 |
| *14 | −34.5554 | (d14) | | |
| 15 | ∞ | 2.00 | 1.51680 | 64.11 |
| 16 | ∞ | (d16) | | |
| IP | ∞ | | | |

TABLE 7-continued (Aspherical Surface Data)

Surface Number: 4 r = 13.0802
κ = +1.8744
C4 = −6.0710E−05
C6 = −6.4789E−07
C8 = +2.7872E−09
C10 = −1.3116E−10

Surface Number: 14 r = −34.5554
κ = −15.6418
C4 = −3.8216E−05
C6 = +2.2449E−07
C8 = −7.9619E−09
C10 = +1.4054E−12

(Variable Distances)

| | INF | CLD |
|---|---|---|
| β = | 0 | −0.0333 |
| d0 = | ∞ | 1083.0699 |
| d8 = | 4.1823 | 2.9253 |
| d14 = | 37.8194 | 39.0764 |
| d16 = | 1.0000 | 1.0000 |

(Lens Group Data)

| Group | S | Focal Length |
|---|---|---|
| 1 | 1 | 159.0713 |
| 2 | 10 | 38.7838 |

(Values for Conditional Expressions)

f = 36.0500
f1 = 159.0713
f2 = 38.7838
Po = 73.6482
TLa = 70.6400
Σd = 30.5000
Σd2 = 11.8500
(1) Po/(TLa − Σd) = 1.8349
(2) TLa/Σd = 2.3160
(3) TLa/f = 1.9594
(4) TLa/Σd2 = 5.9610
(5) f/f2 = 0.9295
(6) f1/f2 = 4.1015

Figure 14A:
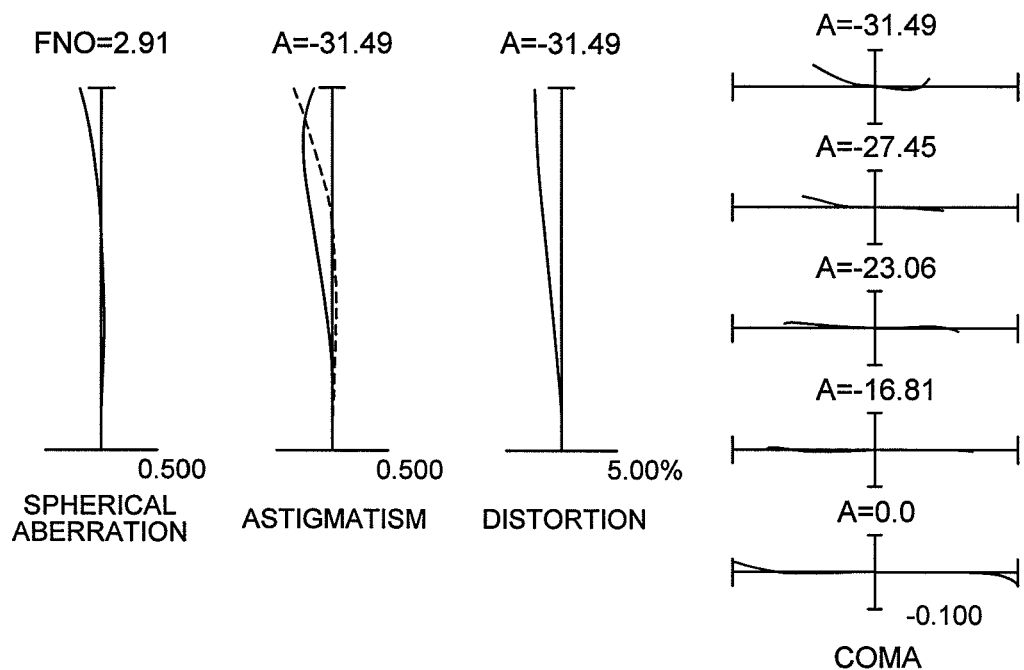
Figure 14B:
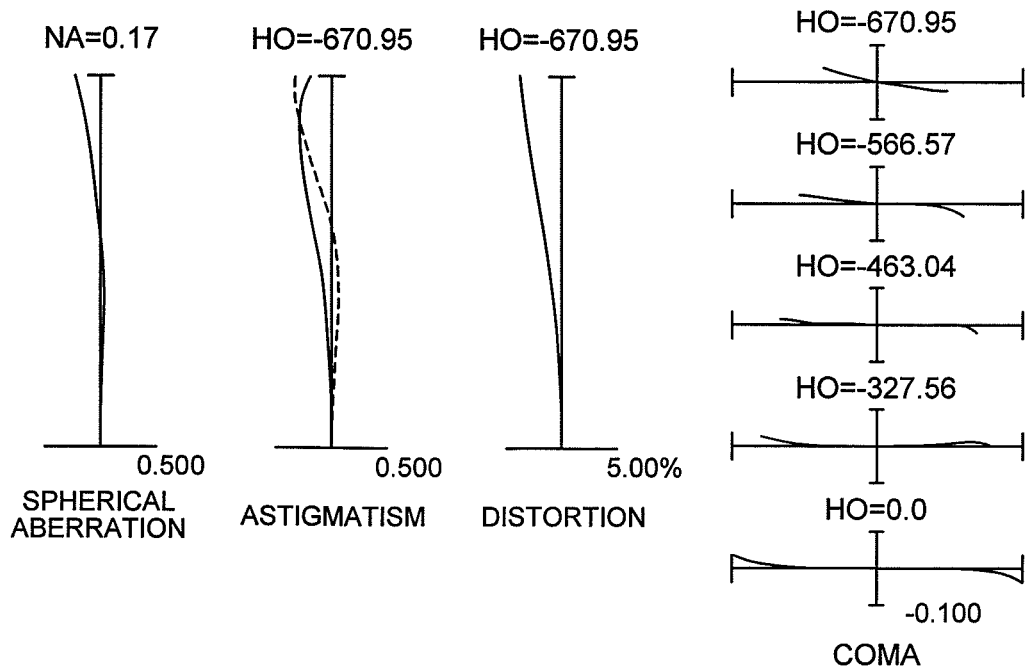

FIGS. 14A and 14B are graphs showing various aberrations of the imaging lens SL7 according to Example 7 of the present invention upon focusing on an infinitely distant object and a close object, respectively.

As apparent from the respective aberration graphs, in Example 7, it is understood that the various aberrations are preferably corrected from an infinite-distance focusing state to a near-distance focusing state, and the excellent optical performance is exhibited.

It should be noted that Example 7 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

EXAMPLE 8

FIG. 15 is a sectional view showing a lens configuration of an imaging lens SL7 according to Example 8 of the present invention.

As illustrated in FIG. 15, the imaging lens SL8 according to Example 8 is composed of, in order from an unillustrated object side, a first lens group G1 having positive refractive power, a second lens group G2 spaced with an air distance from the first lens group G1 and having positive refractive power and a filter group FL spaced with an air distance from the second lens group G2.

The first lens group G1 is composed of, in order from the object side, a positive lens L11 (the first lens component) with its convex surface directed to the object side, a negative meniscus lens L12 (the second lens component) with its convex surface directed to the object side, and a positive meniscus lens L13 (the third lens component) with its convex surface directed to the object side. The second lens group G2 is composed of a cemented lens (the fourth lens component) constructed by a negative lens L21 with its concave surface directed to the object side cemented with a positive lent L22 with its convex surface directed to the image side, and a double convex positive lens L23 (the fifth lens component). The filter group FL is composed of a low-pass filter, an IR cut filter, etc.

In the imaging lens SL8 according to Example 8, upon changing, i.e., focusing, from an infinitely distant object to a close object, the first lens group G1 is fixed with respect to the image plane I, while the second lens group G2 moves with respect to the image plane I, and a distance between the first lens group G1 and the second lens group G2 changes.

The following Table 8 shows the values of various items of data of the imaging lens SL8 according to Example 8 of the present invention.

TABLE 8

(Specifications)

f = 36.05
FNO = 2.91
2ω = 62.99
Y = 21.60
TL = 71.37
BF = 40.87
TLa = 70.69
Bfa = 40.19

(Lens Surface Data)

| i | r | d | nd | νd |
|---|---|---|---|---|
| OS | ∞ | | | |
| 1 | 413.0624 | 1.42 | 1.68893 | 31.07 |
| 2 | −413.0775 | 0.20 | | |
| 3 | 32.2028 | 1.50 | 1.69350 | 53.18 |
| *4 | 12.8317 | 1.43 | | |
| 5 | 16.7375 | 2.20 | 1.88300 | 40.76 |
| 6 | 46.0117 | 0.70 | | |
| 7 | ∞ | 3.60 | Flare Stopper FS1 | |
| 8 | ∞ | (d8) | Aperture Stop S | |
| 9 | ∞ | 3.27 | Flare Stopper FS2 | |
| 10 | −11.5806 | 1.83 | 1.84666 | 23.78 |
| 11 | −32.3229 | 5.21 | 1.75500 | 52.32 |
| 12 | −14.4701 | 0.20 | | |
| 13 | 205.2921 | 4.50 | 1.69350 | 53.20 |
| *14 | −35.9126 | (d14) | | |
| 15 | ∞ | 2.00 | 1.51680 | 64.11 |
| 16 | ∞ | (d16) | | |
| IP | ∞ | | | |

TABLE 8-continued (Aspherical Surface Data)

Surface Number: 4 r = 12.8317
κ = +1.8124
C4 = −6.2827E−05
C6 = −6.6876E−07
C8 = +3.3647E−09
C10 = −1.4164E−10

Surface Number: 14 r = −35.9126
κ = −16.5622
C4 = −3.7900E−05
C6 = +2.0960E−07
C8 = −7.3417E−10
C10 = +1.2589E−12

(Variable Distances)

| | INF | CLD |
|---|---|---|
| β = | 0 | −0.0333 |
| d0 = | ∞ | 1082.2621 |
| d8 = | 4.4448 | 3.1781 |
| d14 = | 37.8699 | 39.1367 |
| d16 = | 1.0000 | 1.0000 |

(Lens Group Data)

| Group | S | Focal Length |
|---|---|---|
| 1 | 1 | 148.0344 |
| 2 | 10 | 38.8421 |

(Values for Conditional Expressions)

f = 36.0500
f = 148.0344
f2 = 38.8421
Po = 75.0807
TLa = 70.6900
Σd = 30.5000
Σd2 = 11.7373
(1) Po/(TLa − Σd) = 1.8682
(2) TLa/Σd = 2.3177
(3) TLa/f = 1.9608
(4) TLa/Σd2 = 6.0226
(5) f/f2 = 0.9281
(6) f1/f2 = 3.8112

Figure 16A:
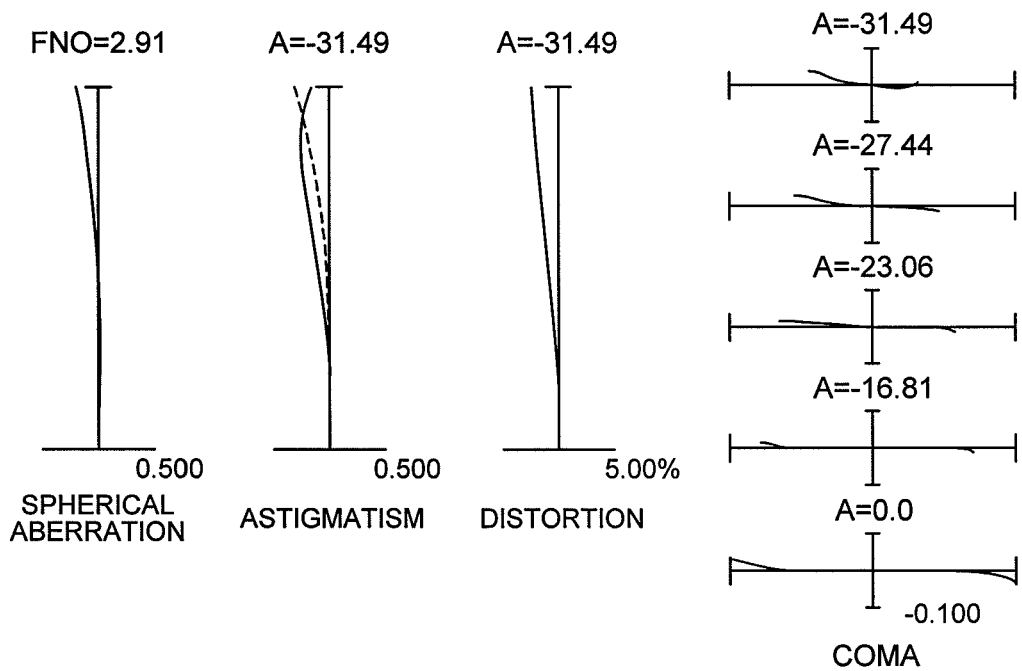
Figure 16B:
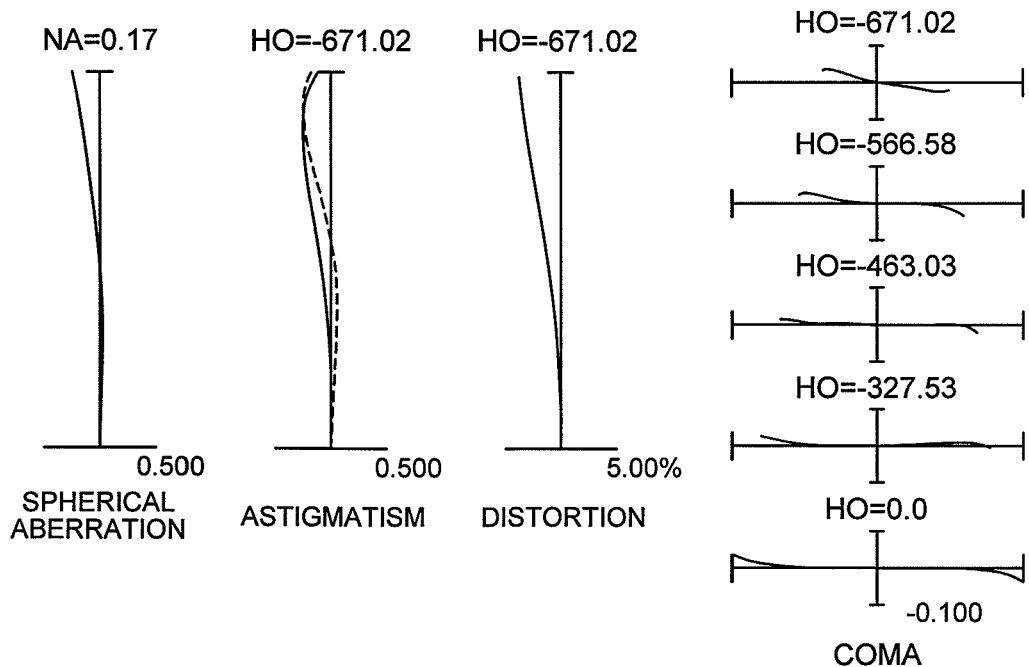

FIGS. 16A and 16B are graphs showing various aberrations of the imaging lens SL8 according to Example 8 of the present invention upon focusing on an infinitely distant object and a close object, respectively.

As apparent from the respective aberration graphs, in Example 8, it is understood that the various aberrations are preferably corrected from an infinite-distance focusing state to a near-distance focusing state, and the excellent optical performance is exhibited.

It should be noted that Example 8 can take a configuration of shifting the whole of the second lens group G2 as the shift lens group in the direction substantially perpendicular to the optical axis and thus correcting the image blur caused by the hand vibration, i.e., performing the vibration reduction. Further, there may be taken another configuration of performing the vibration reduction by shifting a portion of the second lens group G2, i.e., the cemented lens or the positive lens L23 in the direction that is substantially perpendicular to the optical axis.

According to the respective Examples, it is feasible to realize the downsized imaging lens having a wide angle of view of 60 degrees or more and an f-number of about 2.8, enabling the various aberrations to be well corrected upon focusing on the close object from the infinitely distant object and exhibiting the high optical performance over the entire picture.

Herein, each Example is given by way of one specific example of the invention of the present application, however, the invention of the present application is not limited to those Examples. Contents of the following discussion can be properly adopted within a range that does not affect the optical performance.

The 2-group configuration has been exemplified by way of Example of the numeric values of the imaging lens of the present invention, however, the present invention is not limited to this configuration, and the imaging lenses based on other group configurations (e.g., a 3-group or 4-group configuration, etc) can be also constructed. To be specific, any inconvenience may not be caused by taking a configuration of adding a lens or a lens group on the closest object side of the imaging lens according to the present invention and a configuration of adding a lens or a lens group on the closest image side. Note that the lens group represents a portion having at least one lens, which is separated by air distances.

Moreover, the imaging lens according to the present invention may take a configuration of moving a portion of a lens group or a single lens group as a whole or a plurality of lens groups as a focusing lens group(s) in the direction of the optical axis in order to execute focusing on a close object from an infinitely distant object. The focusing lens group can be applied to an auto focus and is suited to being driven by a motor such as an ultrasonic motor for the auto focus. Especially, it is desirable that the second lens group is configured as the focusing lens group.

Moreover, the imaging lens according to the present invention can also adopt a configuration of moving the whole or a portion of any one of the lens groups as an anti-vibration lens group in a way that includes an element in the direction perpendicular to the optical axis or rotationally moving (swaying) the whole or a portion of any one of the lens groups as the vibration reduction lens group in an intra-plane direction containing the optical axis, thereby correcting the image blur caused by the hand vibration. In particular, it is preferable that at least a portion of the second lens group is constructed as the vibration reduction lens group.

Further, any inconvenience may not be caused by forming the lens surface of the lens partly constituting the imaging lens according to the present invention as the spherical surface or the flat surface or the aspherical surface. For example, in Examples 5 through 8, the image side lens surface of the second lens component and the image side lens surface of the fifth lens component are formed as the aspherical surfaces, however, without being limited to this configuration, any inconvenience may not be caused by forming, as the aspherical surface, any one of the object side surface of the second lens component, the object side surface of the third lens component, the object side surface of the negative lens L21 of the fourth lens component (the cemented lens), the object side surface of the positive lens L22 of the fourth lens component and the object side surface of the fifth lens component. A case that the lens surface is the spherical surface or the flat surface facilitates lens machining and an assembly adjustment and is preferable because of preventing the optical performance from being deteriorated due to an error of the machining and the assembly adjustment. Further, if the image plane deviates, there is a small amount of deterioration of rendering performance, which is the desirable aspect. If the lens surface is the aspherical surface, any types of aspherical surfaces are usable, such as an aspherical surface based on the fine grinding, a glass mold aspherical surface formed by molding a glass in an aspherical shape and a composite aspherical surface formed by coating a resin over the surface of the glass in the aspherical shape. Any lens surface may be a diffractive optical surface. Any lens may be a graded index lens (GRIN lens), or a plastic lens.

Further, it is preferable that the aperture stop is disposed on the object side of the second lens group, however, a lens frame may substitute for a role of the aperture stop without providing a member as the aperture stop. Note that this contrivance is similarly applied to the first flare stopper and the second flare stopper provided in each of Examples.

Furthermore, the lens surface of the lens partly constituting the imaging lens according to the present invention may be coated with an anti-reflection coating having a high transmittance in a broad wavelength range. With this anti-reflection coating, it is possible to attain the optical performance with a high contrast by reducing a flare and ghost images.

Moreover, in the imaging lens according to the present invention, it is preferable that the first lens group includes one positive lens component and one negative lens component. Alternatively, it is preferable that the first lens group includes the two positive lens components and one negative lens component. It is preferable that the second lens group includes one positive lens component and one negative lens component. Alternatively, it is preferable that the second lens group includes the two positive lens components.

Next, an optical apparatus including the imaging lens according to the present invention will be described.

Figure 17:
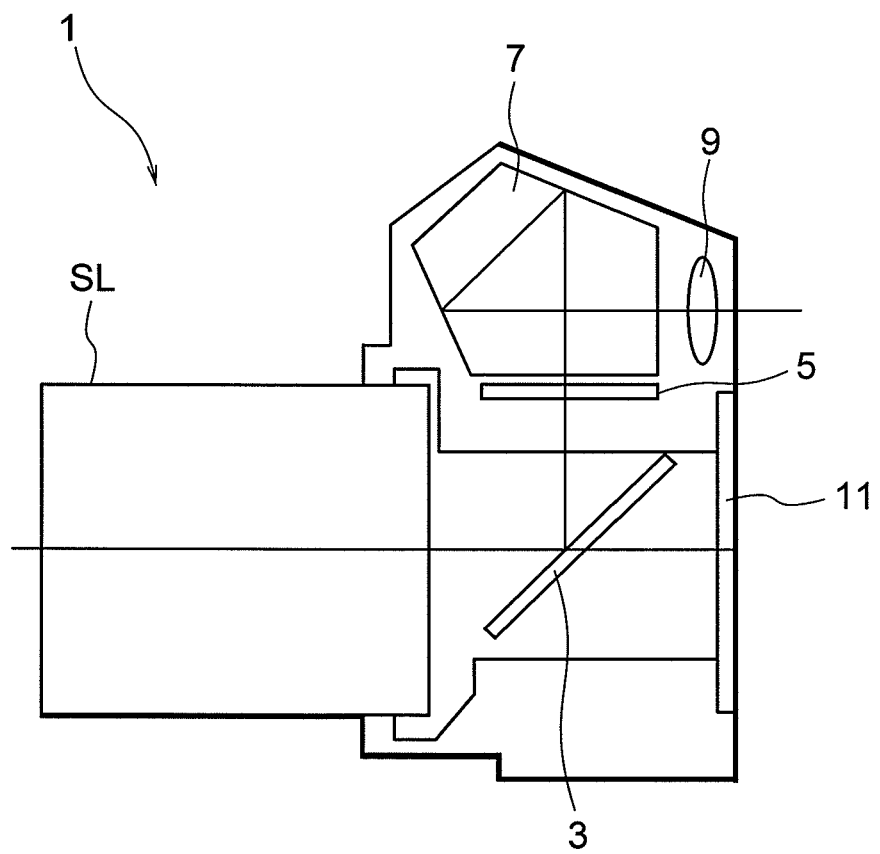
FIG. 17 is a view of an internal configuration of a single-lens reflex digital camera including the imaging lens according to the present invention.

FIG. 17 is a sectional view showing an outline of a single-lens reflex digital camera including the imaging lens according to the present invention. In the single-lens reflex digital camera 1 shown in FIG. 17, light beams from an unillustrated object (an object to be imaged) are converged by the imaging lens SL, and an image of the light beams is formed on a focusing screen 5 via a quick return mirror 3. Then, the light beams, of which the image is formed on the focusing screen 5, are reflected plural times within a pentagonal roof prism 7 and led to an eyepiece 9. A photographer is thereby capable of observing the object (the object to be imaged) as an erected image via the eyepiece 9.

Moreover, when the photographer presses an unillustrated release button, the quick return mirror 3 retreats outside of an optical path, and the light beams from the object (the object to be imaged), which are converged by the imaging lens SL, form an object image on an imaging device 11. Through this process, the image of the light beams from the object is formed by the imaging device 11 and stored as the image of the object in a memory (an illustration of which is omitted). Thus, the photographer can take picture of the object by use of the camera.

With this configuration, the single-lens reflex digital camera 1 including the imaging lens SL according to the present invention has a wide angle of view and can, when focusing on the close object from the infinitely distant object, correct the various aberrations preferably and can realize the high optical performance over the entire picture. Note that the camera 1 in FIG. 17 may be configured to hold the imaging lens in an attachable/detachable manner and may also be molded integrally with the imaging lens. Moreover, the camera may be a single lens reflex camera and may also be a camera that does not include the quick return mirror or the like.

Next, a method for manufacturing an imaging lens according to the present invention will be discussed.

FIG. 18 is a diagram showing an outline of the imaging lens manufacturing method according to the present invention.

The method for manufacturing the imaging lens according to the present invention is a method for manufacturing an imaging lens including, in order from an object side, a first lens group G1 having positive refractive power and a second lens group G2 having a positive refractive power, the method includes the following steps S1-S3.

Step S1: moving the second lens group G2 toward the object side, thereby carrying out focusing on a close object.

Step S2: disposing each lens in order from the object side with satisfying the following conditional expression (1):

$$1.50 < Po/(TLa - \Sigma d) < 2.50 \quad (1)$$

where TLa denotes an air-converted total lens length of the imaging lens, Po denotes a distance from the image plane to an exit pupil in the whole imaging lens system, and $\Sigma d$ denotes a distance along an optical axis between the most object side lens surface of the first lens group and the most image side lens surface of the second lens group.

Step 3: fixing a position of the first lens group G1 with respect to the image plane.

Such a method for manufacturing an imaging lens according to the present invention is capable of manufacturing the downsized imaging lens having a wide angle of view and exhibiting the high optical performance over the entire picture by preferably correcting the various aberrations upon focusing on the close object from the infinitely distant object.

What is claimed is:

1. An imaging lens comprising, in order from an object side:
    a first lens group having positive refractive power; and
    a second lens group having positive refractive power,
    the first lens group being fixed with respect to an image plane,
    the second lens group being moved toward the object side to adjust a focus on a close object, and
    the following conditional expression being satisfied:

$$1.50 < Po/(TLa - \Sigma d) < 2.00$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group,
    wherein the first lens group is composed of a plurality of lens components, and the lens component closest to the object side in the first lens group is a positive lens component.

2. The imaging lens according to claim 1, wherein the following conditional expression is satisfied:

$$1.80 < TLa/\Sigma d < 3.00$$

where TLa denotes the air converted total lens length of the imaging lens, and $\Sigma d$ denotes a distance along the optical axis between the lens surface closest to the object side in the first lens group and the lens surface closest to the image side in the second lens group.

3. The imaging lens according to claim 1, wherein the first lens group is composed of a plurality of lens components.

4. The imaging lens according to claim 1, wherein the first lens group includes, in order from the object side, a positive lens with its convex surface directed to the object side, a negative meniscus lens with its convex surface directed to the object side and a positive meniscus lens with its convex surface directed to the object side.

5. The imaging lens according to claim 4, wherein the negative meniscus lens in the first lens group contains at least one aspherical surface.

6. The imaging lens according to claim 1, wherein the first lens group includes, in order from the object side, a negative meniscus lens with its convex surface directed to the object side and a positive meniscus lens with its convex surface directed to the object side.

7. The imaging lens according to claim 6, wherein the negative meniscus lens in the first lens group contains at least one aspherical surface.

8. The imaging lens according to claim 1, wherein the following conditional expression is satisfied:

$$1.70 < TLa/f < 2.20$$

where TLa denotes the air converted total lens length of the imaging lens, and f denotes a focal length of the imaging lens.

9. The imaging lens according to claim 1, wherein the second lens group includes a cemented lens constructed by a negative lens with its concave surface directed to the object side cemented with a positive lens with its convex surface directed to the image side, and a positive lens.

10. The imaging lens according to claim 9, wherein a cemented surface of the cemented lens has a concave surface directed to the object side.

11. The imaging lens according to claim 9, wherein the positive lens in the second lens group contains at least one aspherical surface.

12. The imaging lens according to claim 1, wherein the following conditional expression is satisfied:

$$5.50 < TLa/\Sigma d2 < 6.50$$

where TLa denotes the air converted total lens length of the imaging lens, and $\Sigma d2$ denotes a distance along the optical axis between the lens surface closest to the object side in the second lens group and the lens surface closest to the image side in the second lens group.

13. The imaging lens according to claim 1, wherein the following conditional expression is satisfied:

$$0.80 < f/f2 < 1.10$$

where f denotes a focal length of the imaging lens, and f2 denotes a focal length of the second lens group.

14. The imaging lens according to claim 1, wherein the following conditional expression is satisfied:

$$2.50 < f1/f2 < 5.10$$

where f1 denotes a focal length of the first lens group, and f2 denotes a focal length of the second lens group.

15. The imaging lens according to claim 1, wherein an aperture stop is provided between the first lens group and the second lens group.

16. The imaging lens according to claim 1, wherein at least one aspherical surface is contained in the first lens group.

17. The imaging lens according to claim 1, wherein at least one aspherical surface is contained in the second lens group.

18. The imaging lens according to claim 1, wherein an image on the image plane can be shifted by shifting at least a portion of the second lens group as a shift lens group in a direction that is substantially perpendicular to an optical axis.

19. An optical apparatus comprising:
    an imaging lens configured to form an image of an object on a predetermined image plane,
    wherein the imaging lens is the imaging lens according to claim 1.

20. A method for manufacturing an imaging lens including, in order from an object side, a first lens group having positive refractive power, and a second lens group having the positive refractive power, the method comprising steps of:
- moving the second lens group toward the object side to carry out focusing on a close object;
- disposing each lens group with satisfying the following conditional expression:

$$1.50<Po/(TLa-\Sigma d)<2.00$$

where TLa denotes an air-converted total lens length of the imaging lens, Po denotes a distance from an image plane to an exit pupil in the imaging lens, and $\Sigma d$ denotes a distance along an optical axis between the most object side lens surface of the first lens group and the most image side lens surface of the second lens group; and
- fixing the first lens group with respect to the image plane, wherein the first lens group is composed of a plurality of lens components, and the lens component closest to the object side in the first lens group is a positive lens component.

21. The method according to claim 20, further comprising a step of:
- disposing each lens component with satisfying the following conditional expression:

$$1.80<TLa/\Sigma d<3.00$$

where TLa denotes the air converted total lens length of the imaging lens, and $\Sigma d$ denotes the distance along the optical axis between the lens surface closest to the object side in the first lens group and the lens surface closest to the image side in the second lens group.

22. The method according to claim 20, further comprising a step of:
- disposing each lens component with satisfying the following conditional expression:

$$1.70<TLa/f<2.20$$

where TLa denotes the air converted total lens length of the imaging lens, and f denotes a focal length of the imaging lens.

23. The method according to claim 20, further comprising a step of:
- disposing each lens component with satisfying the following conditional expression:

$$5.50<TLa/\Sigma d2<6.50$$

where TLa denotes the air converted total lens length of the imaging lens, and $\Sigma d2$ denotes a distance along the optical axis between the lens surface closest to the object side in the second lens group and the lens surface closest to the image side in the second lens group.

24. The method according to claim 20, further comprising a step of:
- disposing each lens component with satisfying the following conditional expression:

$$0.80<f/f2<1.10$$

where f denotes a focal length of the imaging lens, and f2 denotes a focal length of the second lens group.

25. The method according to claim 20, further comprising a step of:
- disposing each lens component with satisfying the following conditional expression:

$$2.50<f1/f2<5.10$$

where f1 denotes a focal length of the first lens group, and f2 denotes a focal length of the second lens group.

26. An imaging lens comprising, in order from an object side:
- a first lens group having positive refractive power; and
- a second lens group having positive refractive power,
- the first lens group being fixed with respect to an image plane,
- the second lens group being moved toward the object side to adjust a focus on a close object, and
- the following conditional expression being satisfied:

$$1.50<Po/(TLa-\Sigma d)<2.50$$

$$2.3056 \leq TLa/\Sigma d<3.00$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group,
- wherein the first lens group is composed of a plurality of lens components, and the lens component closest to the object side in the first lens group is a positive lens component.

27. An imaging lens comprising, in order from an object side:
- a first lens group having positive refractive power; and
- a second lens group having positive refractive power,
- the first lens group being fixed with respect to an image plane,
- the second lens group being moved toward the object side to adjust a focus on a close object, and
- the following conditional expression being satisfied:

$$1.50<Po/(TLa-\Sigma d)<2.50$$

$$1.70<TLa/f \leq 1.9635$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group, and f denotes a focal length of the imaging lens,
- wherein the first lens group is composed of a plurality of lens components, and the lens component closest to the object side in the first lens group is a positive lens component.

28. An imaging lens comprising, in order from an object side:
- a first lens group having positive refractive power; and
- a second lens group having positive refractive power,
- the first lens group being fixed with respect to an image plane,
- the second lens group being moved toward the object side to adjust a focus on a close object, and
- the following conditional expression being satisfied:

$$1.50<Po/(TLa-\Sigma d)<2.50$$

$$0.80<f/f2 \leq 0.9295$$

where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group, f denotes a focal length of the imaging lens, and f2 denotes a focal length of the second lens group, wherein the first lens group is composed of a plurality of lens components, and the lens component closest to the object side in the first lens group is a positive lens component.

29. A method for manufacturing an imaging lens including, in order from an object side, a first lens group having positive refractive power, and a second lens group having the positive refractive power, the method comprising steps of:
    moving the second lens group toward the object side to carry out focusing on a close object;
    disposing each lens group with satisfying the following conditional expression:

$1.50 < Po/(TLa - \Sigma d) < 2.50$ $2.3056 \leq TLa/\Sigma d < 3.00$ where TLa denotes an air-converted total lens length of the imaging lens, Po denotes a distance from an image plane to an exit pupil in the imaging lens, and $\Sigma d$ denotes a distance along an optical axis between the most object side lens surface of the first lens group and the most image side lens surface of the second lens group; and
    fixing the first lens group with respect to the image plane,
    wherein the first lens group is composed of a plurality of lens components, and the lens component closest to the object side in the first lens group is a positive lens component.

30. A method for manufacturing an imaging lens including, in order from an object side, a first lens group having positive refractive power, and a second lens group having the positive refractive power, the method comprising steps of:
    moving the second lens group toward the object side to carry out focusing on a close object;
    disposing each lens group with satisfying the following conditional expression:

$1.50 < Po/(TLa - \Sigma d) < 2.50$ $1.70 < TLa/f \leq 1.9635$ where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group, f denotes a focal length of the imaging lens; and
    fixing the first lens group with respect to the image plane,
    wherein the first lens group is composed of a plurality of lens components, and the lens component closest to the object side in the first lens group is a positive lens component.

31. A method for manufacturing an imaging lens including, in order from an object side, a first lens group having positive refractive power, and a second lens group having the positive refractive power, the method comprising steps of:
    moving the second lens group toward the object side to carry out focusing on a close object;
    disposing each lens group with satisfying the following conditional expression:

$1.50 < Po/(TLa - \Sigma d) < 2.50$ $0.80 < f/f2 \leq 0.9295$ where TLa denotes an air-converted total lens length of the imaging lens, Po denotes a distance from the image plane to an exit pupil in the imaging lens, and $\Sigma d$ denotes a distance along an optical axis between the most object side lens surface of the first lens group and the most image side lens surface of the second lens group, f denotes a focal length of the imaging lens, and f2 denotes a focal length of the second lens group,
    wherein the first lens group is composed of a plurality of lens components, and the lens component closest to the object side in the first lens group is a positive lens component.

* * * * *